(12) United States Patent
Kwon et al.

(10) Patent No.: US 12,022,464 B2
(45) Date of Patent: Jun. 25, 2024

(54) APPARATUS AND METHODS OF SCHEDULING FOR LOW POWER CONSUMPTION

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 629 days.

(21) Appl. No.: 17/261,153

(22) PCT Filed: Apr. 29, 2019

(86) PCT No.: PCT/CN2019/084911
§ 371 (c)(1),
(2) Date: Jan. 18, 2021

(87) PCT Pub. No.: WO2020/015431
PCT Pub. Date: Jan. 23, 2020

(65) Prior Publication Data
US 2021/0345376 A1    Nov. 4, 2021

Related U.S. Application Data

(60) Provisional application No. 62/756,379, filed on Nov. 6, 2018, provisional application No. 62/698,592, filed on Jul. 16, 2018.

(51) Int. Cl.
*H04W 72/1273*  (2023.01)
*H04W 52/02*    (2009.01)
(Continued)

(52) U.S. Cl.
CPC .... *H04W 72/1273* (2013.01); *H04W 52/0235* (2013.01); *H04W 72/23* (2023.01); *H04W 72/569* (2023.01)

(58) Field of Classification Search
CPC ......... H04W 52/0235; H04W 72/1273; H04W 72/23; H04W 72/569; H04W 76/28; Y02D 30/70
See application file for complete search history.

(56) References Cited

U.S. PATENT DOCUMENTS 8,175,109 B2 *  5/2012  Nogueira-Nine .......................... H04W 52/0219 370/461
8,654,694 B2 *  2/2014  Chang ............... H04W 52/0216 455/574

(Continued)

FOREIGN PATENT DOCUMENTS

| CN | 102378325 A | 3/2012 |
| CN | 102946631 A | 2/2013 |

(Continued)

OTHER PUBLICATIONS

LG Electronics, "Discussion on measurement of SS block in asynchronous NR", 3GPP TSG-RAN WG4 Meeting #84, R4-1707859, Aug. 21-25, 2017, 8 Pages, Berlin, Germany.

(Continued)

*Primary Examiner* — Eric Nowlin
(74) *Attorney, Agent, or Firm* — Slater Matsil, LLP

(57) ABSTRACT

Embodiments of this disclosure provide techniques for communicating in a wireless communications system. In particular, in an embodiment a base station receives a capability message from a user equipment (UE) indicating downlink scheduling delay. The base station transmits a downlink control frame to the UE in response to determining that transmitting a frame to the UE satisfies a scheduling delay (Continued)

condition. The downlink control frame indicates a scheduling delay of the frame equal to or greater than the downlink scheduling delay. The base station then transmits the frame to the UE in accordance with the downlink control frame.

24 Claims, 11 Drawing Sheets

(51) Int. Cl.
*H04W 72/23* (2023.01)
*H04W 72/566* (2023.01)

(56) References Cited

U.S. PATENT DOCUMENTS

| | | | | |
|---|---|---|---|---|
| 8,923,178 B2* | 12/2014 | Anderson | ......... | H04W 52/0222 370/252 |
| 8,942,151 B2* | 1/2015 | Anderson | ......... | H04W 52/0222 370/252 |
| 9,191,891 B2* | 11/2015 | Jafarian | ............ | H04W 52/0212 |
| 9,572,100 B2 | 2/2017 | Wei | | |
| 9,743,351 B2* | 8/2017 | Jafarian | ............ | H04W 52/0212 |
| 10,271,282 B2* | 4/2019 | Wilhelmsson | ...... | H04W 40/005 |
| 10,356,839 B2* | 7/2019 | Ang | .................... | H04W 76/28 |
| 10,368,306 B2* | 7/2019 | Tsai | ................. | H04W 52/0206 |
| 10,652,823 B2* | 5/2020 | Ding | ................... | H04B 17/318 |
| 10,979,978 B2* | 4/2021 | Huang | .............. | H04W 52/0229 |
| 10,993,180 B2* | 4/2021 | Ly | .......................... | H04L 5/0053 |
| 11,026,173 B2* | 6/2021 | Wilhelmsson | .... | H04W 52/0229 |
| 11,153,822 B2* | 10/2021 | Wong | ..................... | H04W 76/27 |
| 11,265,813 B2* | 3/2022 | Åström | ................... | H04W 8/24 |
| 11,622,332 B2* | 4/2023 | Huang | ............. | H04W 52/0235 370/336 |
| 11,627,553 B2* | 4/2023 | Ananda | ................ | H04W 68/02 455/458 |
| 2006/0133408 A1* | 6/2006 | Nogueira-Nine | ........................ | H04W 52/0219 370/447 |
| 2012/0275364 A1* | 11/2012 | Anderson | ......... | H04W 52/0222 370/311 |
| 2012/0275365 A1* | 11/2012 | Anderson | .......... | H04W 68/025 370/311 |
| 2014/0126442 A1* | 5/2014 | Jafarian | ........... | H04W 52/0212 370/311 |
| 2014/0211617 A1* | 7/2014 | Tao | ................... | H04W 52/0258 370/230 |
| 2015/0036576 A1* | 2/2015 | Jafarian | ........... | H04W 52/0212 370/311 |
| 2016/0044739 A1* | 2/2016 | Morita | .............. | H04W 52/0206 370/329 |
| 2016/0128128 A1* | 5/2016 | Ang | ...................... | H04W 76/28 370/311 |
| 2017/0250781 A1* | 8/2017 | Golitschek Edler Von Elbwart | ................ | H04L 1/0026 |
| 2018/0077717 A1 | 3/2018 | Janse van Rensburg et al. | | |
| 2018/0110000 A1* | 4/2018 | Shellhammer | .... | H04W 52/0206 |
| 2018/0242241 A1* | 8/2018 | Tsai | ................. | H04W 52/0206 |
| 2018/0310249 A1* | 10/2018 | Wilhelmsson | .... | H04W 52/0241 |
| 2018/0359706 A1* | 12/2018 | Ding | .................... | H04B 17/318 |
| 2019/0223104 A1* | 7/2019 | Huang | ............. | H04W 52/0216 |
| 2019/0313338 A1* | 10/2019 | Wilhelmsson | .... | H04W 52/0229 |
| 2019/0342833 A1* | 11/2019 | Åström | ................... | H04W 8/24 |
| 2020/0029302 A1* | 1/2020 | Cox | ................. | H04W 52/0216 |
| 2020/0053644 A1* | 2/2020 | Obermeier | ........ | H04W 52/0229 |
| 2020/0059862 A1* | 2/2020 | Wong | ..................... | H04W 76/27 |
| 2020/0344695 A1* | 10/2020 | Wang | ................ | H04W 52/0219 |
| 2021/0144645 A1* | 5/2021 | Huang | .............. | H04W 52/0229 |
| 2021/0235258 A1* | 7/2021 | Takeda | .................. | H04L 1/1887 |
| 2021/0351837 A1* | 11/2021 | Nader | .................. | H04B 7/0693 |
| 2022/0070785 A1* | 3/2022 | Huang | ............. | H04W 52/0216 |
| 2022/0182938 A1* | 6/2022 | Ye | ...................... | H04W 52/0232 |

FOREIGN PATENT DOCUMENTS

| | | | | |
|---|---|---|---|---|
| CN | 103703852 A | | 4/2014 | |
| CN | 104956738 A | * | 9/2015 | ............ H04W 24/08 |
| CN | 105165085 A | | 12/2015 | |
| CN | 107113726 A | * | 8/2017 | ........ H04W 52/0212 |
| CN | 104956738 B | * | 3/2019 | ............ H04W 24/08 |
| CN | 110073696 A | * | 7/2019 | ........ H04W 52/0229 |
| CN | 110167184 A | * | 8/2019 | ......... H04W 40/244 |
| CN | 110463285 A | * | 11/2019 | ........ H04W 52/0216 |
| CN | 110521245 A | * | 11/2019 | .......... H04W 40/005 |
| CN | 110636596 A | * | 12/2019 | ........ H04W 52/0212 |
| CN | 107113726 B | * | 4/2020 | ........ H04W 52/0212 |
| CN | 110754120 B | * | 5/2022 | .............. H04W 4/70 |
| CN | 110167184 B | * | 9/2022 | .......... H04W 40/244 |
| CN | 110521245 B | * | 9/2022 | .......... H04W 40/005 |
| CN | 110073696 B | * | 12/2022 | ........ H04W 52/0229 |
| EP | 1657852 A1 | * | 5/2006 | ........ H04W 52/0219 |
| EP | 2774424 B1 | * | 11/2017 | ............ H04W 24/08 |
| EP | 3216308 B1 | * | 12/2019 | ........ H04W 52/0212 |
| EP | 3634082 A1 | * | 4/2020 | ........ H04W 52/0212 |
| EP | 3613241 B1 | * | 5/2021 | .......... H04W 40/005 |
| EP | 3619987 B1 | * | 11/2021 | .............. H04W 4/70 |
| ES | 2779306 T3 | * | 8/2020 | ........ H04W 52/0212 |
| JP | 2006148906 A | * | 6/2006 | ........ H04W 52/0219 |
| JP | 2020513710 A | * | 5/2020 | |
| JP | 2020518166 A | * | 6/2020 | |
| JP | 6982632 B2 | * | 12/2021 | .......... H04W 40/005 |
| KR | 20170080596 A | * | 7/2017 | |
| KR | 20190105676 A | * | 9/2017 | |
| KR | 20190089967 A | * | 7/2019 | |
| KR | 102099502 B1 | * | 4/2020 | |
| KR | 102174045 B1 | * | 11/2020 | |
| KR | 102279555 B1 | * | 7/2021 | |
| KR | 102424043 B1 | * | 7/2022 | |
| RU | 2734321 C1 | * | 10/2020 | .......... H04W 40/005 |
| WO | WO-2014114358 A1 | * | 7/2014 | ............ H04W 24/08 |
| WO | 2015122739 A1 | | 8/2015 | |
| WO | WO-2016073087 A1 | * | 5/2016 | ........ H04W 52/0212 |
| WO | 2016206894 A1 | | 12/2016 | |
| WO | WO-2016206894 A1 | * | 12/2016 | ........ H04W 52/0229 |
| WO | 2017136592 A1 | | 8/2017 | |
| WO | 2017173388 A1 | | 10/2017 | |
| WO | WO-2018075130 A1 | * | 4/2018 | ........ H04W 52/0206 |
| WO | WO-2018108264 A1 | * | 6/2018 | ........ H04W 52/0229 |
| WO | WO-2018175760 A1 | * | 9/2018 | ........ H04W 52/0216 |
| WO | WO-2018192746 A1 | * | 10/2018 | .......... H04W 40/005 |
| WO | WO-2018202751 A1 | * | 11/2018 | .............. H04W 4/70 |
| WO | WO-2019066846 A1 | * | 4/2019 | |
| WO | WO-2020015431 A1 | * | 1/2020 | ........ H04W 52/0235 |
| WO | WO-2020089267 A1 | * | 5/2020 | .......... H04B 7/0602 |
| WO | WO-2020205652 A1 | * | 10/2020 | .......... H04L 1/1812 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.1.0, Technical Specification, Mar. 2018, 271 Pages.

LTE-A Comp, "Research on Selecation and Scheduling Techniques in LTE-A CoMP System", May 2015, 66 Pages, (English Abstract).

* cited by examiner

APPARATUS AND METHODS OF SCHEDULING FOR LOW POWER CONSUMPTION

CROSS-REFERENCE TO RELATED APPLICATIONS

This patent application is a national phase filing under section 371 of PCT/CN2019/084911, filed on Apr. 29, 2019, which claims the benefit of U.S. Provisional Application No. 62/698,592, filed on Jul. 16, 2018 and U.S. Provisional Application No. 62/756,379, filed on Nov. 6, 2018, the teaching and disclosure of which are hereby incorporated herein by reference in their entireties.

TECHNICAL FIELD

The present disclosure relates generally to wireless communications, and, in particular embodiments, to a system and method of scheduling for low power consumption in a wireless network.

BACKGROUND

Generally, modern wireless communication systems use multiple radio frequency (RF) chains and multiple antennas with beamforming management for improved system performance. The systems that take advantage of this technology typically operate at millimeter wave frequencies and above, which suffer from high path loss. To overcome the high path loss, beamforming techniques may be used to increase signal gain by shaping and/or directing beams used for signal transmission and/or reception. To maximize performance, additional communication overhead is typically required to determine the necessary precoders used by the transmitting or receiving device. This may result in an increase in complexity and an increase in power consumption in these types of systems.

SUMMARY

Technical advantages are generally achieved by embodiments of this disclosure, which describes a system and method of scheduling for low power consumption.

A first aspect relates to a method for scheduling a wireless communication by a base station, where the base station receives a capability message from a user equipment (UE) indicating a scheduling delay for the UE to receive a transmission from the base station. The bases station transmits a downlink control frame to the UE indicating a scheduled time for reception of a frame by the UE. A time delay between the scheduled time and reception time of the downlink control frame being greater than or equal to the scheduling delay. The base station transmits the frame to the UE in accordance with the scheduled time. The delay in the scheduling allows for an RF chain of the UE to transition from an OFF state to an ON state prior to receiving the frame. Thus, power consumption at the UE is reduced by indicating a scheduled time for the reception of the frame by the UE in accordance with its capability.

In a first implementation form of the method according to the first aspect as such, the scheduling delay corresponds to a time delay for transitioning a receive radio frequency (RF) chain of the UE from an OFF state to an ON state. Thus, the UE may be in a reduced power state prior to receiving the downlink control frame.

In a second implementation form of the method according to the first aspect as such or any preceding implementation form of the first aspect, the scheduling delay corresponds to a set of modulation and coding schemes (MCSs), and where a scheduled MCS of a corresponding frame transmission is within the set of MCSs. Thus, the base station may use the MCS information to determine the scheduling delay resulting in efficient power reduction at the UE.

In a third implementation form of the method according to the first aspect as such or any preceding implementation form of the first aspect, the scheduling delay corresponds to a set of ranks. A scheduled rank of the corresponding frame transmission is within the set of ranks. Thus, the base station may use the transmission rank information to determine the scheduling delay resulting in efficient power reduction at the UE.

In a fourth implementation form of the method according to the first aspect as such or any preceding implementation form of the first aspect, the downlink control frame further indicates to the UE to turn ON a receive radio frequency (RF) chain of the UE. Thus, the UE may be in a reduced power state prior to receiving the downlink control frame.

In a fifth implementation form of the method according to the first aspect as such or any preceding implementation form of the first aspect, the transmitting the downlink control frame includes determining, by the base station, that the frame to be transmitted from the base station to the UE uses a modulation and coding scheme (MCS) index level that is within a set of MCS index levels and, based thereon, transmitting the downlink control frame. Thus, the base station may use the MCS information to determine the scheduling delay resulting in efficient power reduction at the UE.

In a sixth implementation form of the method according to the first aspect as such or any preceding implementation form of the first aspect, the transmitting the downlink control frame includes determining, by the base station, that the frame to be transmitted from the base station to the UE uses a rank that is within a set of ranks and, based thereon, transmitting the downlink control frame. Thus, the base station may use the transmission rank information to determine the scheduling delay resulting in efficient power reduction at the UE.

In a seventh implementation form of the method according to the first aspect as such or any preceding implementation form of the first aspect, the transmitting the downlink control frame includes determining, by the base station for a set period of time, no data transmissions being scheduled prior to the transmission of the frame and, based thereon, transmitting the downlink control frame.

In an eight implementation form of the method according to the first aspect as such or any preceding implementation form of the first aspect, the transmitting the downlink control frame includes determining, by the base station, that the UE is in a DRX ON duration. Thus, the base station may use the information related to a DRX mode cycle of the UE to determine the scheduling delay.

In a ninth implementation form of the method according to the first aspect as such or any preceding implementation form of the first aspect, the frame is a first data transmission during the DRX ON duration. Thus, the base station may use the information related to a DRX mode cycle of the UE to determine the scheduling delay.

In a tenth implementation form of the method according to the first aspect as such or any preceding implementation form of the first aspect, the transmitting the downlink control frame includes determining, by the base station, that a receive RF chain of the UE is turned OFF before the scheduled transmission of the frame and, based thereon, transmitting the downlink control frame.

In an eleventh implementation form of the method according to the first aspect as such or any preceding implementation form of the first aspect, the scheduling delay is a time delay for transitioning a receive radio frequency (RF) chain of the UE from an OFF state to an ON state, and where the transmitting the downlink control frame includes determining, by the base station, that the receive RF chain of the UE is turned ON before the scheduled transmission of the frame by the base station and, based thereon, transmitting the downlink control frame.

In a twelfth implementation form of the method according to the first aspect as such or any preceding implementation form of the first aspect, the transmitting the downlink control frame includes determining, by the base station, that a transmission of the frame to the UE successfully triggers a transition of a receive RF chain of the UE to an ON state and, based thereon, transmitting the downlink control frame.

In a thirteenth implementation form of the method according to the first aspect as such or any preceding implementation form of the first aspect, the transmitting the downlink control frame includes determining, by the base station, a request for a channel state information reference signal (CSI-RS) measurement and, based thereon, transmitting the downlink control frame.

In a fourteenth implementation form of the method according to the first aspect as such or any preceding implementation form of the first aspect, the frame includes a CSI-RS resource for a CSI-RS measurement by the UE. Thus, the UE is in a reduced power state prior to receiving the downlink control frame.

In a fifteenth implementation form of the method according to the first aspect as such or any preceding implementation form of the first aspect, the downlink control frame requests for a CSI measurement.

In a sixteenth implementation form of the method according to the first aspect as such or any preceding implementation form of the first aspect, the downlink control frame instructs the UE to transition a plurality of receive RF chains of the UE from the OFF state to the ON state. Thus, the UE may be in a reduced power state prior to receiving the downlink control frame.

In a seventeenth implementation form of the method according to the first aspect as such or any preceding implementation form of the first aspect, the downlink control frame is transmitted over a physical downlink control channel (PDCCH).

In an eighteenth implementation form of the method according to the first aspect as such or any preceding implementation form of the first aspect, the frame is transmitted over a physical downlink shared channel (PDSCH).

In a nineteenth implementation form of the method according to the first aspect as such or any preceding implementation form of the first aspect, the capability message further indicates a second scheduling delay for transitioning a transmit RF chain of the UE from an OFF state to an ON state. Thus, the UE may be in a reduced power state prior to receiving the downlink control frame.

In a twentieth implementation form of the method according to the first aspect as such or any preceding implementation form of the first aspect, the frame is a first frame, and where the method further includes transmitting, by the base station, a second downlink control frame indicating a second scheduled time for transmission of a second frame by the UE, a second time delay between the second scheduled time and a reception time of the second downlink control frame being greater than or equal to the second scheduling delay. Thus, power consumption at the UE is reduced by indicating a second scheduled time for the transmission of the second frame by the UE in accordance with its capability.

In a twenty-first implementation form of the method according to the first aspect as such or any preceding implementation form of the first aspect, the method further includes receiving, by the base station, the second frame from the UE in accordance with the second scheduled time.

In a twenty-second implementation form of the method according to the first aspect as such or any preceding implementation form of the first aspect, the downlink control frame is a first downlink control frame, the method further includes transmitting, by the base station, a second downlink control frame to the UE prior to the transmitting the first downlink control frame, the second downlink control frame indicating a scheduled time for a reception of a second frame by the UE, the time interval between receiving the second downlink control frame and the frame, by the UE, being greater than a set timer value with an expiration. Thus, power consumption at the UE is reduced by indicating a second scheduled time for the receiving of the second frame by the UE in accordance with its capability.

In a twenty-second implementation form of the method according to the first aspect as such or any preceding implementation form of the first aspect, the downlink control frame is a first downlink control frame, the method further includes transmitting, by the base station, a second downlink control frame to the UE prior to the transmitting the first downlink control frame, the second downlink control frame indicating a scheduled time for a reception of a second frame by the UE, the time interval between receiving the second downlink control frame and the first downlink control frame, by the UE, being greater than a set timer value with an expiration. Thus, power consumption at the UE is reduced by indicating a second scheduled time for the receiving of the second frame by the UE in accordance with its capability.

In a twenty-third implementation form of the method according to the first aspect as such or any preceding implementation form of the first aspect, the downlink control frame is a first downlink control frame, and where the frame is a first frame, the method further includes transmitting, by the base station, a second downlink control frame to the UE prior to the transmitting the first downlink control frame, the second downlink control frame indicating a scheduled time for a reception of a second frame by the UE, the time interval between receiving the second frame and the first frame, by the UE, being greater than a set timer value with an expiration. Thus, a timer can be efficiently utilized to schedule communications between a base station and UE, which can provide an efficient solution for a reduction in UE power consumption.

In a twenty-third implementation form of the method according to the first aspect as such or any preceding implementation form of the first aspect, the downlink control frame is a first downlink control frame, and where the frame is a first frame, the method further includes transmitting, by the base station, a second downlink control frame to the UE prior to the transmitting the first downlink control frame, the second downlink control frame indicating a time delay between a reception of a second frame by the UE and the reception of the second downlink control frame by the UE, the time delay between reception of the second frame the first downlink control frame being greater than a set timer value with an expiration. Thus, a timer can be efficiently utilized to schedule communications between a base station and UE, which can provide an efficient solution for a reduction in UE power consumption.

In a twenty-fourth implementation form of the method according to the first aspect as such or any preceding implementation form of the first aspect, the scheduling delay corresponds to an activation of a scheduling time delay restriction, the activation corresponding to scheduling the scheduled time in accordance with a minimum time value. Thus, communication overhead is reduced by signaling a restriction.

In a twenty-fifth implementation form of the method according to the first aspect as such or any preceding implementation form of the first aspect, the minimum time value is pre-defined in a standard. Thus, communication overhead is reduced.

In a twenty-sixth implementation form of the method according to the first aspect as such or any preceding implementation form of the first aspect, the capability message includes an activation bit indicating an activation or deactivation of the scheduling time delay restriction. Thus, communication overhead is reduced.

A second aspect relates to another method for scheduling a wireless communication by the base station, where the base station receives a capability message from a user equipment (UE) indicating a scheduling delay for the UE to transmit to the base station. The base station transmits a downlink control frame to the UE indicating a scheduled time for a transmission of a frame by the UE. A time delay between the scheduled time and a reception time of the downlink control frame being greater than or equal to the scheduling delay. The base station receives the frame from the UE in accordance with the scheduled time. The delay in the scheduling allows for an RF chain of the UE to transition from an OFF state to an ON state prior to transmitting the frame. Thus, power consumption at the UE is reduced by indicating a scheduled time for the transmission of the frame by the UE in accordance with its capability.

In a first implementation form of the method according to the second aspect as such, the scheduling delay corresponds to a time delay for transitioning a transmit radio frequency (RF) chain of the UE from an OFF state to an ON state. Thus, the UE may be in a reduced power state prior to receiving the downlink control frame.

In a second implementation form of the method according to the second aspect as such or any preceding implementation form of the second aspect, the scheduling delay corresponds to a set of modulation and coding schemes (MCSs), and where a scheduled MCS of a corresponding frame transmission is within the set of MCSs. Thus, the base station may use the MCS information to determine the scheduling delay for efficient power reduction at the UE.

In a third implementation form of the method according to the second aspect as such or any preceding implementation form of the second aspect, the scheduling delay corresponds to a set of ranks, and where a scheduled rank of the corresponding frame transmission is within the set of ranks. Thus, the base station may use the transmission rank information to determine the scheduling delay resulting in efficient power reduction at the UE.

In a fourth implementation form of the method according to the second aspect as such or any preceding implementation form of the second aspect, the downlink control frame further indicates to the UE to turn ON a transmit radio frequency (RF) chain of the UE. Thus, the UE may be in a reduced power state prior to receiving the downlink control frame, which reduces power consumption at the UE.

In a fifth implementation form of the method according to the second aspect as such or any preceding implementation form of the second aspect, the transmitting the downlink control frame includes determining, by the base station, that the frame to be received by the base station from the UE uses a modulation and coding scheme (MCS) index level that is within a set of MCS index levels and, based thereon, transmitting the downlink control frame. Thus, the base station may use the MCS information to determine the scheduling delay for efficient power reduction at the UE.

In a sixth implementation form of the method according to the second aspect as such or any preceding implementation form of the second aspect, the transmitting the downlink control frame includes determining, by the base station, that the frame to be received by the base station from the UE uses a rank that is within a set of ranks and, based thereon, transmitting the downlink control frame. Thus, the base station may use the transmission rank information to determine the scheduling delay resulting in efficient power reduction at the UE.

In a seventh implementation form of the method according to the second aspect as such or any preceding implementation form of the second aspect, the transmitting the downlink control frame includes determining, by the base station for a set period of time, no data receptions being scheduled prior to the transmission of the frame and, based thereon, transmitting the downlink control frame.

In an eight implementation form of the method according to the second aspect as such or any preceding implementation form of the second aspect, the transmitting the downlink control frame includes determining, by the base station, that the UE is in a DRX ON duration. Thus, the base station may use the information related to a DRX mode cycle of the UE to determine the scheduling delay.

In a ninth implementation form of the method according to the second aspect as such or any preceding implementation form of the second aspect, the frame is a first data reception during the DRX ON duration. Thus, the base station may use the information related to a DRX mode cycle of the UE to determine the scheduling delay.

In a tenth implementation form of the method according to the second aspect as such or any preceding implementation form of the second aspect, the transmitting the downlink control frame includes determining, by the base station, that a transmit RF chain of the UE is turned ON before the scheduled transmission of the frame by the UE and, based thereon, transmitting the downlink control frame.

In an eleventh implementation form of the method according to the second aspect as such or any preceding implementation form of the second aspect, the scheduling delay is a time delay for transitioning a transmit radio frequency (RF) chain of the UE from an OFF state to an ON state, and where the transmitting the downlink control frame includes determining, by the base station, that the transmit RF chain of the UE is turned ON before the scheduled transmission of the frame by the UE and, based thereon, transmitting the downlink control frame.

In a twelfth implementation form of the method according to the second aspect as such or any preceding implementation form of the second aspect, the RF chain of the UE is a transmit RF chain, and where the transmitting the downlink control frame includes determining, by the base station, that the transmit RF chain of the UE is turned ON before the scheduled reception of the frame and, based thereon, transmitting the downlink control frame.

In a thirteenth implementation form of the method according to the second aspect as such or any preceding implementation form of the second aspect, the transmitting the downlink control frame includes determining, by the base station, that a transmission of the frame by the UE successfully triggers a transition of a transmit RF chain of the UE to an ON state and, based thereon, transmitting the downlink control frame.

In a fourteenth implementation form of the method according to the second aspect as such or any preceding implementation form of the second aspect, the downlink control frame instructs the UE to transition a plurality of transmit RF chains of the UE from the OFF state to the ON state.

In a fifteenth implementation form of the method according to the second aspect as such or any preceding implementation form of the second aspect, the downlink control frame is transmitted over a physical downlink control channel (PDCCH).

In a sixteenth implementation form of the method according to the second aspect as such or any preceding implementation form of the second aspect, the frame is received over a physical downlink shared channel (PUSCH).

In a seventeenth implementation form of the method according to the second aspect as such or any preceding implementation form of the second aspect, the capability message further indicates a second scheduling delay for transitioning a receive RF chain of the UE from an OFF state to an ON state. Thus, the UE may be in a reduced power state prior to receiving the downlink control frame, which reduces power consumption at the UE.

In an eighteenth implementation form of the method according to the second aspect as such or any preceding implementation form of the second aspect, the frame is a first frame, and where the method further includes transmitting, by the base station, a second downlink control frame indicating a second scheduled time for reception of a second frame by the UE, a second time delay between the second scheduled time and a reception time of the second downlink control frame being greater than or equal to the second scheduling delay. The delay in the second scheduling allows for an RF chain of the UE to transition from an OFF state to an ON state prior to receive the frame. Thus, power consumption at the UE is reduced by indicating a second scheduled time for the reception of the second frame by the UE in accordance with its capability.

In a nineteenth implementation form of the method according to the second aspect as such or any preceding implementation form of the second aspect, the method further includes transmitting, by the base station, the second frame to the UE in accordance with the second scheduled time.

In a twentieth implementation form of the method according to the second aspect as such or any preceding implementation form of the second aspect, the downlink control frame is a first downlink control frame, the method further includes transmitting, by the base station, a second downlink control frame to the UE prior to the transmitting the first downlink control frame, the second downlink control frame indicating a scheduled time for a transmission of a second frame by the UE, the time interval between transmitting the second downlink control frame and receiving the frame, by the base station, being greater than a set timer value with an expiration. Thus, a timer can be efficiently utilized to schedule communications between a base station and UE, which can provide an efficient solution for a reduction in UE power consumption.

In a twenty-first implementation form of the method according to the second aspect as such or any preceding implementation form of the second aspect, the downlink control frame is a first downlink control frame, the method further includes transmitting, by the base station, a second downlink control frame to the UE prior to the transmitting the first downlink control frame, the second downlink control frame indicating a scheduled time for a transmission of a second frame by the UE, the time interval between transmitting the second downlink control frame and the first downlink control frame, by the base station, being greater than a set timer value with an expiration. Thus, power consumption at the UE is reduced by indicating a second scheduled time for the transmission of the second frame by the UE in accordance with its capability.

In a twenty-second implementation form of the method according to the second aspect as such or any preceding implementation form of the second aspect, the downlink control frame is a first downlink control frame, and where the frame is a first frame, the method further includes transmitting, by the base station, a second downlink control frame to the UE prior to the transmitting the first downlink control frame, the second downlink control frame indicating a scheduled time for a transmission of a second frame by the UE, the time interval between transmitting the second frame and the first frame, by the UE, being greater than a set timer value with an expiration. Thus, a timer can be efficiently utilized to schedule communications between a base station and UE, which can provide an efficient solution for a reduction in UE power consumption.

In a twenty-third implementation form of the method according to the second aspect as such or any preceding implementation form of the second aspect, the downlink control frame is a first downlink control frame, and where the frame is a first frame, the method further includes transmitting, by the base station, a second downlink control frame to the UE prior to the transmitting the first downlink control frame, the second downlink control frame indicating a time delay between a transmission of a second frame by the UE and the reception of the second downlink control frame by the UE, the time delay between transmission of the second frame by the UE and reception of the first downlink control frame by the UE being greater than a set timer value with an expiration. Thus, a timer can be efficiently utilized to schedule communications between a base station and UE, which can provide an efficient solution for a reduction in UE power consumption.

In a twenty-fourth implementation form of the method according to the second aspect as such or any preceding implementation form of the second aspect, the scheduling delay corresponds to an activation of a scheduling time delay restriction, the activation corresponding to scheduling the scheduled time in accordance with a minimum time value. Thus, communication overhead between the UE and the base station may be reduced by signaling the restriction.

In a twenty-fifth implementation form of the method according to the second aspect as such or any preceding implementation form of the second aspect, the minimum time value is pre-defined in a standard. Thus, communication overhead is reduced by minimizing the amount of data exchanged between the base station and the UE.

In a twenty-sixth implementation form of the method according to the second aspect as such or any preceding implementation form of the second aspect, the capability message includes an activation bit indicating an activation or deactivation of the scheduling time delay restriction. Thus, communication overhead is reduced by minimizing the amount of data exchanged between the base station and the UE.

A third aspect relates to method for scheduling a wireless communication at a user equipment (UE), where the UE transmits a capability message to a base station indicating a scheduling delay for transmitting a frame to the base station. The UE receives a downlink control frame from the base station over a receive radio frequency (RF) chain of the UE. The downlink control frame indicates a scheduled time for transmitting the frame by the UE. A time delay between the scheduled time and reception time of the downlink control frame being greater than or equal to the scheduling delay. The UE transmits the frame to the base station over a transmit RF chain of the UE in accordance with the scheduled time. The delay in the scheduling allows for the RF chain of the UE to transition from an OFF state to an ON state prior to transmitting the frame. Thus, power consumption at the UE is reduced by indicating a scheduled time for the transmission in accordance with the UE capability.

In a first implementation form of the method according to the third aspect as such, the frame is transmitted over a physical uplink shared channel (PUSCH).

In a second implementation form of the method according to the third aspect as such or any preceding implementation form of the third aspect, the downlink control frame is received, by the UE, over a physical downlink control channel (PDCCH), the method further includes monitoring, by the UE, the PDCCH over the receive RF chain; and decoding, by the UE, the downlink control frame after the receiving.

A fourth aspect relates to another method for scheduling a wireless communication. The method includes transmitting, by a user equipment (UE), a capability message to a base station over a transmit radio frequency (RF) chain of the UE, where the capability message indicates a scheduling delay for receiving a frame from the base station, receiving, by the UE, a downlink control frame from the base station over a first receive RF chain of the UE, the downlink control frame indicating a scheduled time for receiving the frame by the UE, a time delay between the scheduled time and reception time of the downlink control frame being greater than or equal to the scheduling delay, and receiving, by the UE, the frame from the base station over the first receive RF chain and a second receive RF chain in accordance with the scheduled time. The delay in the scheduling allows for the RF chain of the UE to transition from an OFF state to an ON state prior to receiving the frame. Thus, power consumption at the UE is reduced by indicating a scheduled time for the frame reception in accordance with the UE capability.

In a first implementation form of the method according to the fourth aspect as such, the frame is received over a physical downlink shared channel (PDSCH).

In a second implementation form of the method according to the fourth aspect as such or any preceding implementation of the fourth aspect, the downlink control frame is received over a physical downlink control channel (PDCCH), the method further includes monitoring, by the UE, the PDCCH over the first receive RF chain; and decoding, by the UE, the downlink control frame after the receiving.

In a third implementation form of the method according to the fourth aspect as such or any preceding implementation of the fourth aspect, the downlink control frame is a first downlink control frame, the frame is a first frame, the first downlink control frame further indicating to the UE that a transmission rank of the frame is two (2) or higher, the method further includes receiving, by the UE, a second downlink control frame from the base station over the first receive RF chain prior to receiving the first downlink control frame, the second downlink control frame indicating a second scheduled time for a reception of a second frame having a transmission rank of one (1); and receiving, by the UE, the second frame from the base station over the first receive RF chain prior to the receiving of the first downlink control frame. Thus, the UE may receive transmissions with different ranks and accordingly an efficient solution for enabling one or more RF chains can be realized.

In a fourth implementation form of the method according to the fourth aspect as such or any preceding implementation of the fourth aspect, the method further includes decoding, by the UE, the first downlink control frame, and turning ON, by the UE, the second receive RF chain. Thus, the UE may be in a reduced power state prior to receiving the downlink control frame, which reduces power consumption at the UE.

In a fifth implementation form of the method according to the fourth aspect as such or any preceding implementation of the fourth aspect, the UE is configured to turn ON the second receive RF chain in response to receiving a message indicating that a transmission rank of a frame to be received is of rank two (2) or higher. Thus, the UE may receive transmissions with different ranks and accordingly an efficient solution for enabling one or more RF chains can be realized.

In a sixth implementation form of the method according to the fourth aspect as such or any preceding implementation of the fourth aspect, the UE includes a timer having a set ON time before expiring, the timer configured to control the ON and OFF status of the second receive RF chain, the second receive RF chain in the OFF state in response to expiring of the timer, the method further includes setting, by the UE, the timer to the set ON time in response to receiving a signal indicating that a transmission rank of a frame to be received is of rank two (2) or higher. Thus, the UE may receive transmissions with different ranks and accordingly an efficient solution for enabling one or more RF chains can be realized.

In a seventh implementation form of the method according to the fourth aspect as such or any preceding implementation of the fourth aspect, the timer continues to decrease in response to receiving a signal indicating a transmission rank of a frame to be received is of rank one (1). Thus, the UE may receive transmissions with different ranks and accordingly an efficient solution for enabling one or more RF chains can be realized.

A fifth aspect relates to another method for scheduling a wireless communication. The method includes transmitting, by a user equipment (UE), a capability message to a base station indicating a scheduling delay for receiving a frame from the base station; receiving, by the UE operating in a discontinuous reception (DRX) ON state, a downlink control frame from the base station over a first receive RF chain of the UE, the downlink control frame indicating a scheduled time for receiving the frame by the UE, a time delay between reception of the frame and the downlink control frame, by the UE, being greater than or equal to the scheduling delay; and receiving, by the UE operating in the DRX ON state, the frame from the base station in accordance with the scheduled time over the first receive RF chain and a second receive RF chain. Thus, an efficient solution for enabling RF chains of the UE operating in a DRX mode cycle can be realized.

In a first implementation form of the method according to the fifth aspect as such, the frame includes a transmission rank of two (2) or higher. Thus, the UE may receive transmissions with different ranks and accordingly an efficient solution for enabling one or more RF chains can be realized.

In a second implementation form of the method according to the fifth aspect as such or any preceding implementation form of the fifth aspect, the UE switches between the DRX ON state and a DRX OFF state in a DRX cycle. Thus, an efficient solution for enabling RF chains of the UE operating in a DRX mode cycle can be realized.

In a third implementation form of the method according to the fifth aspect as such or any preceding implementation form of the fifth aspect, the UE operates under a DRX operation including a long DRX cycle and a short DRX cycle. Thus, an efficient solution for enabling RF chains of the UE operating in a DRX mode cycle can be realized.

In a fourth implementation form of the method according to the fifth aspect as such or any preceding implementation form of the fifth aspect, the UE operates under a DRX operation including a long DRX cycle. Thus, an efficient solution for enabling RF chains of the UE operating in a DRX mode cycle can be realized.

In a fifth implementation form of the method according to the fifth aspect as such or any preceding implementation form of the fifth aspect, the method further includes turning ON, by the UE operating in the DRX ON state, the second receive RF chain in response to the receiving the downlink control frame. Thus, an efficient solution for enabling RF chains of the UE operating in a DRX mode cycle can be realized.

In a sixth implementation form of the method according to the fifth aspect as such or any preceding implementation form of the fifth aspect, the method further includes receiving, by the UE operating in the DRX ON state, a second downlink control frame from the base station indicating a second scheduled time for receiving a second frame by the UE; and receiving, by the UE, the second frame from the base station over the first and second receive RF chains in accordance with the second scheduled time. Thus, an efficient solution for enabling RF chains of the UE operating in a DRX mode cycle can be realized.

In a seventh implementation form of the method according to the fifth aspect as such or any preceding implementation form of the fifth aspect, the second frame includes a transmission rank of two (2) or higher. Thus, the UE may receive transmissions with different ranks and accordingly an efficient solution for enabling one or more RF chains can be realized.

In an eight implementation form of the method according to the fifth aspect as such or any preceding implementation form of the fifth aspect, the method further includes receiving, by the UE operating in a second DRX ON state, a third downlink control frame from the base station indicating a third scheduled time for receiving a third frame having a rank of 1; and receiving, by the UE operating in the second DRX ON state, the third frame over the first receive RF chain of the UE in accordance with the third scheduled time. Thus, an efficient solution for enabling RF chains of the UE operating in the DRX mode cycle can be realized.

In a ninth implementation form of the method according to the fifth aspect as such or any preceding implementation form of the fifth aspect, the method further includes turning OFF, by the UE, the first and second receive RF chains in response to the UE operating in a DRX OFF state. Thus, an efficient solution for enabling RF chains of the UE operating in a DRX mode cycle can be realized.

In a tenth implementation form of the method according to the fifth aspect as such or any preceding implementation form of the fifth aspect, the method further includes turning ON, by the UE, the first receive RF chain in response to the UE operating in the DRX ON state. Thus, an efficient solution for enabling RF chains of the UE operating in a DRX mode cycle can be realized.

In an eleventh implementation form of the method according to the fifth aspect as such or any preceding implementation form of the fifth aspect, the method further includes turning ON, by the UE, the second receive RF chain in response to the UE operating in the DRX ON state and in response to receiving, by the UE, a transmission with a transmission rank of two (2) or higher. Thus, the UE may receive transmissions with different ranks and accordingly an efficient solution for enabling one or more RF chains can be realized.

A sixth aspect relates to another method for scheduling a wireless communication at a user equipment (UE). The method includes transmitting, by the UE, a capability message to a base station indicating a scheduling delay for transmitting a frame to the base station; receiving, by the UE operating in a discontinuous reception (DRX) ON state, a downlink control frame from the base station over a receive radio frequency (RF) chain of the UE, the downlink control frame indicating a scheduled time for transmitting the frame by the UE, a time delay between a transmission of the frame and a reception of the downlink control frame by the UE being greater than or equal to the scheduling delay; and transmitting, by the UE operating in the DRX ON state, the frame to the base station over a transmit RF chain in accordance with the scheduled time. Thus, an efficient solution for enabling RF chains of the UE operating in a DRX mode cycle can be realized.

In a first implementation form of the method according to the sixth aspect as such, the frame includes a transmission rank of two (2) or higher. Thus, the UE may receive transmissions with different ranks and accordingly an efficient solution for enabling one or more RF chains can be realized.

In a second implementation form of the method according to the sixth aspect as such or any preceding implementation form of the sixth aspect, the UE switches between the DRX ON state and a DRX OFF state in a DRX cycle. Thus, an efficient solution for enabling RF chains of the UE operating in a DRX mode cycle can be realized.

In a third implementation form of the method according to the sixth aspect as such or any preceding implementation form of the sixth aspect, the UE operates under a DRX operation including a long DRX cycle and a short DRX cycle. Thus, an efficient solution for enabling RF chains of the UE operating in a DRX mode cycle can be realized.

In a fourth implementation form of the method according to the sixth aspect as such or any preceding implementation form of the sixth aspect, the UE operates under a DRX operation including a long DRX cycle. Thus, an efficient solution for enabling RF chains of the UE operating in a DRX mode cycle can be realized.

In a fifth implementation form of the method according to the sixth aspect as such or any preceding implementation form of the sixth aspect, the method further includes turning ON, by the UE operating in the DRX ON state, the transmit RF chain in response to the receiving the downlink control frame. Thus, an efficient solution for enabling RF chains of the UE operating in a DRX mode cycle can be realized.

In a sixth implementation form of the method according to the sixth aspect as such or any preceding implementation form of the sixth aspect, the method further includes receiving, by the UE operating in the DRX ON state, a second downlink control frame from the base station over the first receive RF chain, the second downlink control frame indicating a second scheduled time for a transmission of a second frame by the UE, a time delay between a reception of the second downlink control frame by the UE and the scheduled time being less than the scheduling delay; and transmitting, by the UE, the second frame from the base station over the transmit RF chain in accordance with the second scheduled time. Thus, an efficient solution for enabling RF chains of the UE operating in a DRX mode cycle can be realized.

In a seventh implementation form of the method according to the sixth aspect as such or any preceding implementation form of the sixth aspect, the second frame includes a transmission rank of two (2) or higher. Thus, the UE may receive transmissions with different ranks and accordingly an efficient solution for enabling one or more RF chains can be realized.

In an eight implementation form of the method according to the sixth aspect as such or any preceding implementation form of the sixth aspect, the method further includes turning OFF, by the UE, the receive RF chain and the transmit RF chain in response to the UE operating in a DRX OFF state. Thus, the UE is in a low power state during a DRX OFF state of the DRX mode cycle, which provides an efficient solution for reducing power consumption by the UE to be realized.

In a ninth implementation form of the method according to the sixth aspect as such or any preceding implementation form of the sixth aspect, the method further includes turning ON, by the UE, the receive RF chain in response to the UE operating in the DRX ON state. Thus, an efficient solution for enabling RF chains of the UE operating in a DRX mode cycle can be realized.

In a tenth implementation form of the method according to the sixth aspect as such or any preceding implementation form of the sixth aspect, the method further includes turning ON, by the UE, the transmit RF chain in response to the UE operating in the DRX ON state and in response to a transmission with a rank of two (2) or higher. Thus, the UE may receive transmissions with different ranks and accordingly an efficient solution for enabling one or more RF chains can be realized.

A seventh aspect relates to a base station for scheduling a wireless communication, where the base station includes a non-transitory memory storage comprising instructions and one or more processors in communication with the non-transitory memory storage. The one or more processors execute the instructions to receive a capability message from a user equipment (UE) indicating a scheduling delay for the UE to receive a transmission from the base station, transmit a downlink control frame to the UE indicating a scheduled time for reception of a frame by the UE, where a time delay between the scheduled time and reception time of the downlink control frame being greater than or equal to the scheduling delay, and transmit the frame to the UE in accordance with the scheduled time. The delay in the scheduling allows for an RF chain of the UE to transition from an OFF state to an ON state prior to receiving the frame. Thus, power consumption at the UE is reduced by indicating a scheduled time for the reception of the frame by the UE in accordance with its capability.

An eight aspect relates to another base station for scheduling a wireless communication, where the base station includes a non-transitory memory storage comprising instructions and one or more processors in communication with the non-transitory memory storage. The one or more processors execute the instructions to receive a capability message from a user equipment (UE) indicating a scheduling delay for the UE to transmit to the base station, transmit a downlink control frame to the UE indicating a scheduled time for a transmission of a frame by the UE, a time delay between the scheduled time and a reception time of the downlink control frame being greater than or equal to the scheduling delay, and receive the frame from the UE in accordance with the scheduled time. The delay in the scheduling allows for an RF chain of the UE to transition from an OFF state to an ON state prior to transmitting the frame. Thus, power consumption at the UE is reduced by indicating a scheduled time for the transmission of the frame by the UE in accordance with its capability.

A ninth aspect relates to a user equipment (UE) for scheduling a wireless communication, where the UE includes a receive radio frequency (RF) chain, a non-transitory memory storage comprising instructions, and one or more processors in communication with the non-transitory memory storage. The one or more processors execute the instructions to transmit a capability message to a base station indicating a scheduling delay for transmitting a frame to the base station, receive a downlink control frame from the base station over the receive RF chain of the UE, where the downlink control frame indicating a scheduled time for transmitting the frame by the UE, where a time delay between the scheduled time and reception time of the downlink control frame being greater than or equal to the scheduling delay, and transmit the frame to the base station over a transmit RF chain of the UE in accordance with the scheduled time. The delay in the scheduling allows for an RF chain of the UE to transition from an OFF state to an ON state prior to transmitting the frame. Thus, power consumption at the UE is reduced by indicating a scheduled time for the transmission of the frame by the UE in accordance with its capability.

A tenth aspect relates to another user equipment (UE) for scheduling a wireless communication, where the UE includes a first and a second receive radio frequency (RF) chain, a non-transitory memory storage comprising instructions, and one or more processors in communication with the non-transitory memory storage. The one or more processors execute the instructions to transmit a capability message to a base station indicating a scheduling delay for receiving a frame from the base station, receive a downlink control frame from the base station over the first receive RF chain of the UE, where the downlink control frame indicating a scheduled time for receiving the frame by the UE, where a time delay between the scheduled time and reception time of the downlink control frame being greater than or equal to the scheduling delay, and receive the frame from the base station over the first receive RF chain and the second receive RF chain in accordance with the scheduled time. The delay in the scheduling allows for an RF chain of the UE to transition from an OFF state to an ON state prior to receiving the frame. Thus, power consumption at the UE is reduced by indicating a scheduled time for the reception of the frame by the UE in accordance with its capability.

An eleventh aspect relates to another user equipment (UE) for scheduling a wireless communication, where the is UE operating in a discontinuous reception (DRX) mode. The UE includes a first and a second receive radio frequency (RF) chain, a non-transitory memory storage comprising instructions, and one or more processors in communication with the non-transitory memory storage. The one or more processors execute the instructions to transmit a capability message to a base station indicating a scheduling delay for receiving a frame from the base station, receive a downlink control frame from the base station over the first receive RF chain of the UE in a DRX ON state, the downlink control frame indicating a scheduled time for receiving the frame by the UE, where a time delay between reception of the frame and the downlink control frame, by the UE, being greater than or equal to the scheduling delay, and receive the frame from the base station in accordance with the scheduled time over the first receive RF chain and the second receive RF chain of the UE in the DRX ON state. The delay in the scheduling allows for an RF chain of the UE to transition from an OFF state to an ON state prior to receiving the frame in accordance with the DRX ON state of the DRX mode cycle. Thus, power consumption at the UE is reduced by indicating a scheduled time for the reception of the frame by the UE in accordance with its capability.

A twelfth aspect relates to another user equipment (UE) for scheduling a wireless communication, where the UE is operating in a discontinuous reception (DRX) mode. The UE includes a receive radio frequency (RF) chain, a transmit RF chain, a non-transitory memory storage comprising instructions, and one or more processors in communication with the non-transitory memory storage. The one or more processors execute the instructions to transmit a capability message to a base station indicating a scheduling delay for transmitting a frame to the base station, receive a downlink control frame from the base station over the receive RF chain of the UE in a DRX ON state, the downlink control frame indicating a scheduled time for transmitting the frame by the UE, where a time delay between a transmission of the frame and a reception of the downlink control frame by the UE being greater than or equal to the scheduling delay, and transmit the frame to the base station over the transmit RF chain in accordance with the scheduled time, the UE operating in a DRX ON state. The delay in the scheduling allows for an RF chain of the UE to transition from an OFF state to an ON state prior to transmitting the frame in accordance with the DRX ON state of the DRX mode cycle. Thus, power consumption at the UE is reduced by indicating a scheduled time for the transmission of the frame by the UE in accordance with its capability.

The base station and the UE can be programmably-arranged to perform a computer program of the embodiments disclosed. Embodiments can be implemented in hardware, software or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
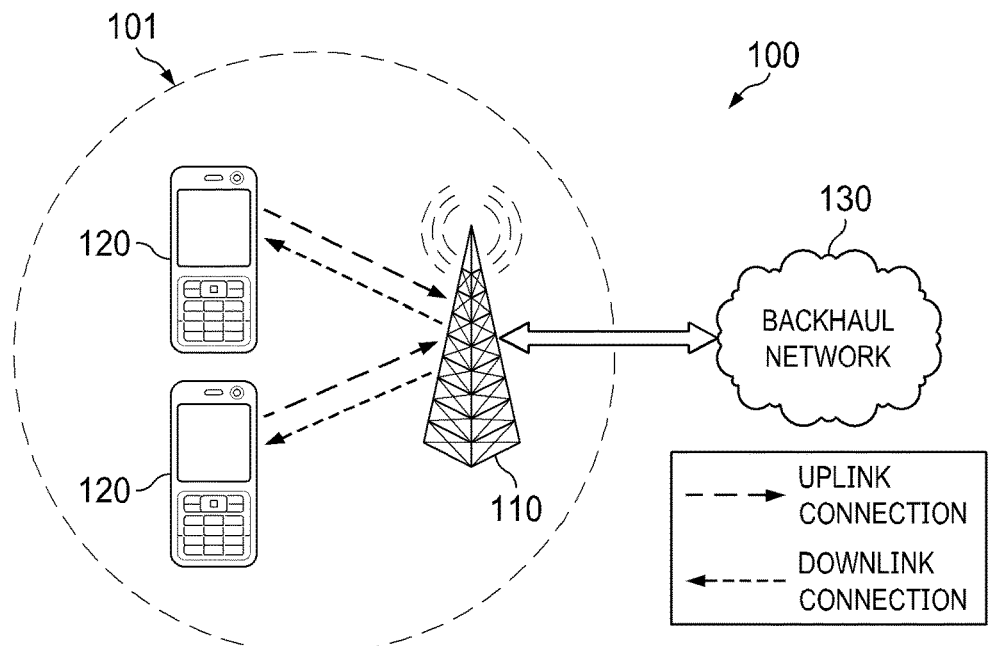
FIG. 1 is a diagram of an embodiment wireless communications network.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

5G NR wireless communication networks provide support for simultaneous communication streams in both downlink and uplink channel paths. A user equipment (UE), capable of operating within the 5G NR network, is configured to operate using multiple radio frequency (RF) chains in both the downlink receive and the uplink transmit paths. It is noted that each RF chain consumes nearly the same amount of power as a single RF chain and very little power is shared between each of the multiple RF chains within the UE. Therefore, to provide support for multiple RF chains, the amount of power drawn by the UE is significantly increased from the single RF chain configuration.

After initial access, a UE operating in a normal state, monitors the downlink control channel to identify whether any downlink or uplink resources are scheduled for the UE. In most operational scenarios considered in 5G NR, there will not be a significant performance degradation expected for receiving and decoding the downlink control channel even if the UE uses a single RX chain for the downlink control channel reception. This is because the lowest modulation and coding scheme (MCS) is used for the downlink control channel. However, as the downlink control channel indicates scheduled downlink or uplink data channel resource, where the scheduled resource can happen as early as on the same slot, all UE transmit and receive chains should be ready for transmitting and receiving when the UE receives the downlink control channel. Therefore, when a UE is operating in a normal state, the UE activates all of its transmit and receive chains and is ready for transmitting and/or receiving.

Embodiments of this disclosure provide techniques for decreasing power consumption by the UE in a network supporting multiple transmit and receive RF chains. A base station receives a capability message from a UE. In some embodiments, the capability message may indicate to the base station a scheduling delay for the UE to receive a transmission from the base station in a downlink reception. In some embodiments, the capability message may indicate to the base station a scheduling delay for the UE to transmit data to the base station in an uplink transmission. In an embodiment, the scheduling delay may correspond to a minimum value, which the base station uses for scheduling communications between the UE and the base station. Accordingly, the scheduling by the base station may have a delay greater than the minimum value explicitly indicated in the capability message. In another embodiment, the capability message may indicate to the base station the application/activation or deactivation of a scheduling delay restriction. The scheduling restriction corresponds to applying a scheduling delay for scheduling communications between the UE and the base station. In some embodiments, the scheduling delay value may be pre-defined and not be explicitly communicated to the base station. As an example, the pre-defined scheduling delay value may be defined in a standard. The capability message therefore indicates to the base station the activation or deactivation of the scheduling delay for purposes of communication scheduling between the base station and the UE. In some embodiments, the activation or deactivation of the scheduling delay may be communicated in the capability message as a single bit value. For example, a bit value of one (1) may indicate the activation of the scheduling delay and a bit value of zero (0) may indicate the deactivation of the scheduling delay, or vice versa.

In some embodiments, the scheduling delay may include a time delay for transitioning a receive radio frequency (RF) chain of the UE from an OFF state to an ON state. In other embodiments, the capability message may indicate to the base station a scheduling delay for the UE to transmit a transmission to the base station. In this embodiment, the scheduling delay may include a time delay for transitioning a transmit radio frequency (RF) chain of the UE from an OFF state to an ON state. In an embodiment, the scheduling delay may include a set of modulation and coding schemes (MCSs). In this embodiment, a scheduled MCS of the frame transmission is within the set of MCSs. In another embodiment, the scheduling delay may include a set of ranks. Rank may refer to layers used or a number of different data streams to be transmitted/received simultaneously on the same time and frequency resources by the UE.

Aspects of this disclosure provide an embodiment method for scheduling, by a base station, communication of a frame with a UE, in accordance with the capability message. A base station transmits a downlink control frame to the UE. In one embodiment, for a downlink reception, the downlink control frame indicates a time delay between a reception of the downlink control frame and a reception or transmission of the frame, by the UE. In another embodiment, for an uplink transmission, the downlink control frame indicates a time delay between a reception of the downlink control frame and a transmission of the frame by the UE. In either embodiment, the time delay is greater than or equal to the scheduling delay and in accordance with the capability message received by the UE. In some embodiments, the downlink control frame may be transmitted over a PDCCH. In one embodiment, the downlink control frame may instruct the UE to transition the receive RF chain of the UE from the OFF state to the ON state. In another embodiment, the downlink control frame may instruct the UE to transition the transmit RF chain of the UE from the OFF state to the ON state.

The UE may communicate, for example through the capability message, to the base station a time interval corresponding to a timer value with an expiration. In one embodiment, the base station may transmit a first and second downlink control frame to the UE, respectively. The first and second downlink control frame, each scheduling a frame (e.g., first and second frame) to be transmitted or received by the UE. The first and second frame may each be an uplink frame, a downlink frame, or a combination thereof. The first downlink control frame instructs the UE to transition a receive or transmit RF chain of the UE from the OFF state to the ON state. In one embodiment, the time interval between transmitting, by the base station, the first downlink control frame and the second downlink control frame is greater than a set time interval corresponding to the timer value. In a second embodiment, the time interval between transmitting or receiving the first frame and the transmitting of the second downlink control frame is greater than the set time interval corresponding to the timer value. In a third embodiment, the time interval between transmitting or receiving the first frame and the transmitting or receiving of the second frame is greater than the set time interval corresponding to the timer value. In a fourth embodiment, the time interval between transmitting the first downlink control frame and the transmitting or receiving of the second frame is greater than the set time interval corresponding to the timer value.

In some embodiments, the UE may have a timer. One or more of the UE RF chains may be in an OFF state when the timer is expired. The timer may be reset to activate the one or more RF chains. In some embodiments, the UE may operate under a DRX mode. One or more RF chains of the UE may turn ON during a DRX ON state. One or more RF chains of the UE may turn OFF during a DRX OFF state. The one or more RF chains may be OFF in a DRX ON state when the rank of the downlink transmission is less than the number of RF chains. In an embodiment, an RF chain may be in an ON state in response to a DRX ON state and a transmission rank of 2 or more. In another embodiment, an RF chain may be in an ON state in response to a DRX ON state and a scheduling of data transmission. In a DRX ON state where the transmission rank is N, N RF chains may be in an ON state to receive or transmit data. These and other details are discussed in greater detail below.

FIG. 1 is diagram of a network 100 for communicating data. The network 100 includes a base station no having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data communicated over the uplink/downlink connections may include data communicated between the UEs 120, as well as data communicated to/from a remote-end (not shown) by way of the backhaul network 130. As used herein, the term "base station" refers to any network-side device configured to provide wireless access to a network, such as an enhanced Node B (eNodeB or eNB), a gNB, a transmit/receive point (TRP), a macrocell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 100 may include various other wireless devices, such as relays, low power nodes, etc.

Figure 2:
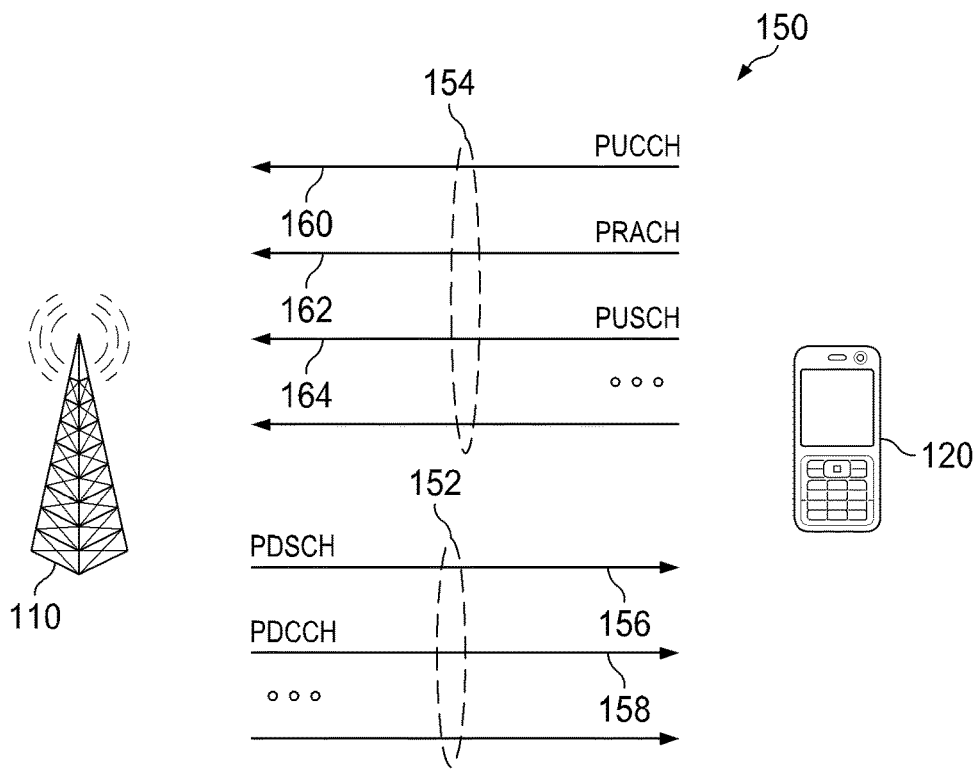
FIG. 2 is a diagram of an embodiment channel structure between a base station and a user equipment (UE)

FIG. 2 illustrates a communications system 150 highlighting an example channel structure between the base station 110 and the UE 120. In a bi-directional communications implementation, the base station 110 and the UE 120 are in communication through a downlink channel 152 and an uplink channel 154. In some embodiments, the downlink channel 152 and the uplink channel 154 may each include multiple unidirectional channels. The downlink channel 152 may include a physical downlink shared channel (PDSCH) 156 and a physical downlink control channel (PDCCH) 158. The uplink channel 154 may include a physical uplink control channel (PUCCH) 160, a physical random access channel (PRACH) 162, and a physical uplink shared channel (PUSCH) 164. The downlink channel 152 and uplink channel 154 may include other channels.

Figure 3:
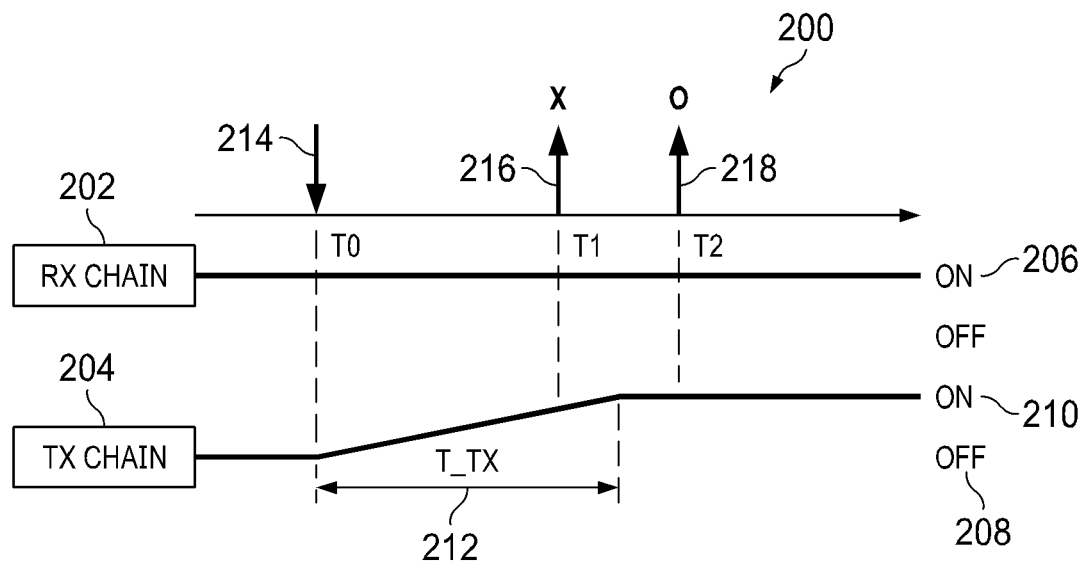
FIG. 3 is a diagram of an embodiment timeline operation for scheduling an uplink data transmission.

FIG. 3 is a diagram of an embodiment timeline diagram 200 for scheduling an uplink data transmission, by a UE 120. The UE 120 includes a receive RF chain 202 and a transmit RF chain 204. The receive RF chain 202 is used to receive RF signals and the transmit RF chain 204 is used to transmit RF signals. In a normal operating state, the receive RF chain 202 is in an ON state 206. This allows for the UE to monitor the downlink control channel. The downlink control channel may be used to schedule, by the base station no, an uplink data transmission for the UE 120. The transmit RF chain 204 may be in an OFF state 208 prior to the UE 120 receiving and decoding the scheduling information received over the downlink control channel. The transmit RF chain 204 includes a time duration of T_TX 212 to transition from an OFF state 208 to an ON state 210. In the ON state 210, the UE 120 is able to transmit.

At time $T_0$ 214, the UE 120 receives a downlink control frame, from the base station no to schedule a transmission of data by the UE 120. The downlink control frame is received by the UE over the downlink control channel and the receive RF chain 202. The downlink control frame indicates to the UE of a scheduled time for transmission of the frame by the UE 120. The frame is to be transmitted over the uplink shared channel and the transmit RF chain 204 of the UE.

The UE 120, upon receiving and decoding the downlink control frame, turns the transmit RF chain 204 from the OFF state 208 to the ON state 210. The transmit RF chain 204 is ready at time $T=T_0+T\_TX$.

If the scheduled time for transmission of the frame by the UE, as indicated in the downlink control frame, is at time $T_2$ 218, where $T_2 \geq (T_0+T\_TX)$, the transmit RF chain 204 is ready and able to properly transmit the data frame.

However, if the scheduled time for transmission of the frame by the UE, as indicated in the downlink control frame, is at time $T_1$ 216, where $T_1 \geq (T_0+T\_TX)$, the transmit RF chain 204 is NOT ready and unable to transmit at time $T_1$ 216. Therefore, even though the base station no schedules the UE 120 to transmit data at time $T_1$ 216, the UE 120 is unable to perform this task. Therefore, in some solutions for proper operation, the transmit RF chain 204 is always in an ON state 210 and consuming power without transmitting data.

Figure 4:
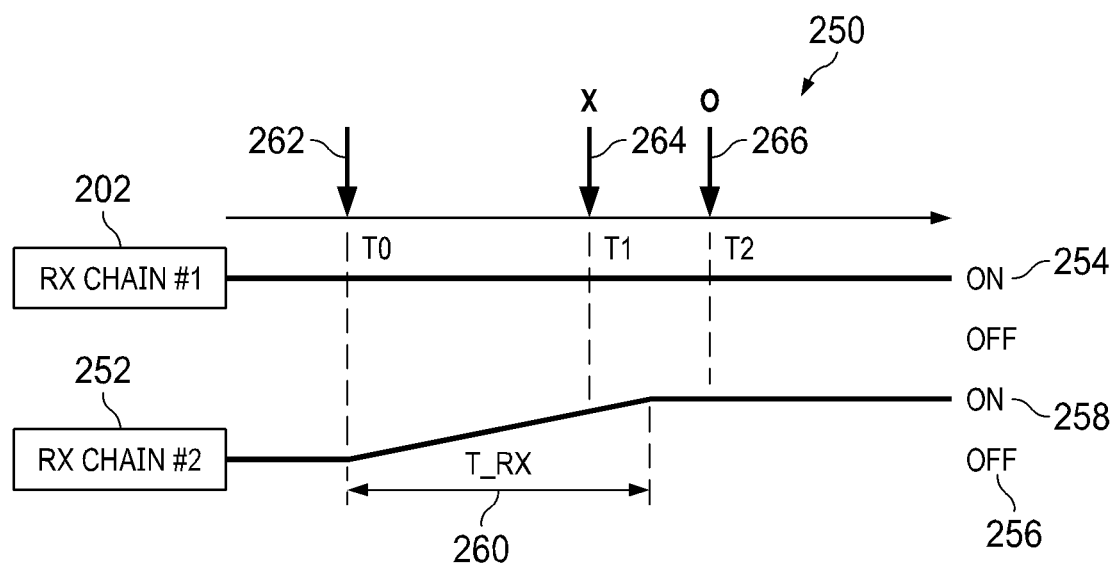
FIG. 4 is a diagram of an embodiment timeline operation for scheduling a downlink data transmission.

FIG. 4 is a diagram of an embodiment timeline diagram 250 for scheduling a downlink data reception, by a UE 120. The UE includes a first receive RF chain 202 and a second receive RF chain 252. In a normal operating state, the first receive RF chain 202 remains in an ON state 254 to monitor the downlink control channel. A single receive RF chain may be needed to monitor the downlink control channel. Therefore, the second receive RF chain 252, prior to receiving a scheduling information, may be in an OFF state. The downlink control channel may be used to schedule, by the base station 110, a downlink data reception for the UE 120. The second receive RF chain 252 includes a time duration of T_RX 260 to transition from an OFF state 256 to an ON state 258. In the ON state 258, the UE 120 is able to receive over the second receive RF chain 252.

At time $T_0$ 262, the first receive RF chain 202 receives a downlink control frame, from the base station 110 to schedule a reception of data by the UE 120. The downlink control frame is received over the downlink control channel by the first receive RF chain 252. The downlink control frame indicates to the UE of a scheduled time for reception of the frame by the UE. The frame is to be received over the downlink shared channel by the first and second receive RF chains 250 and 252, respectively.

The UE 120, upon receiving and decoding the downlink control frame, turns the second receive RF chain 252 from the OFF state 256 to the ON state 258. The second receive RF chain 252 is ready at time $T=T_0+T\_RX$.

If the scheduled time for reception of the frame by the UE, as indicated in the downlink control frame, is at time $T_2$ 266, where $T_2 \geq (T_0+T\_RX)$, the second receive RF chain 252 is ready and able to properly receive at time $T_2$ 266.

However, if the scheduled time for reception of the frame by the UE, as indicated in the downlink control frame, is at time $T_1$ 264, where $T_1 \leq (T_0+T\_RX)$, the second receive RF chain 252 is NOT ready and unable to receive at time $T_1$ 264. Therefore, even though the base station 110 schedules the UE 120 to receive data at time $T_1$ 264, the UE 120 is unable to perform this task. Therefore, in some solutions for proper operation, the second receive RF chain 252 is always in an ON state 258 and consuming power without receiving data.

A Discontinuous Reception (DRX) operation, as proposed during the standardization activities of the $3^{rd}$ Generation Partnership Project (3GPP) NR, is used to reduce and save power consumption by the UE. The basic media access control (MAC) layer operation for DRX utilizes a multiplicity of parameters. These parameters are the duration at the beginning of a DRX cycle (drx-onDurationTimer), the delay in slots before starting the drx-onDurationTimer, the subframe where the DRX cycle starts (drx-StartOffset), the duration after the PDCCH occasion in which a PDCCH indicates a new uplink (UL) or downlink (DL) transmission for the MAC entity (drx-InactivityTimer), the maximum duration until a downlink retransmission is received per a downlink hybrid automatic repeat request (HARQ) process (drx-RetransmissionTimerDL), the maximum duration until a grant for uplink retransmission is received per an uplink HARQ process (drx-RetransmissionTimerUL), the Long DRX cycle (drx-Long Cycle), the Short DRX cycle (drx-ShortCycle), optionally the duration the UE shall follow the short DRX cycle (drx-ShortCycleTimer), the minimum duration before a downlink assignment for HARQ retransmission is expected by the MAC entity per downlink HARQ process (drx-HARQ-RTT-TimerDL), and the minimum duration before an uplink HARQ retransmission grant is expected by the MAC entity per an uplink HARQ process (drx-HARQ-RTT-TimerUL).

Active Time may refer to a time duration that a UE is in an active state and able to monitor the downlink control channels. As a first example, for a configured DRX cycle, the Active Time may include the time that the drx-onDurationTimer, drx-InactivityTimer, drx-RetransmissionTimerDL, drx-RetransmissionTimerUL, or a ra-ContentionResolutionTimer is running.

In a second example, the Active Time may include the time that a scheduling request is sent on a PUCCH in which the scheduling request is pending. In a third example, the Active Time may include the time that a PDCCH, indicating a new transmission addressed to the cell-radio network temporary identifier (C-RNTI) of the MAC entity, has not been received after successful reception of a Random Access Response for the Random Access Preamble not selected by the MAC entity among the contention-based Random Access Preamble.

The basic MAC layer operation for DRX includes the condition that:

If a MAC protocol data unit (PDU) is transmitted in a configured uplink grant, start the drx-HARQ-RTT-TimerUL for the corresponding hybrid automatic repeat request (HARQ) process immediately after the first repetition of the corresponding physical uplink shared channel (PUSCH) transmission. In addition, stop the drx-RetransmissionTimerUL for the corresponding HARQ process.

If a drx-HARQ-RTT-TimerDL expires and if the data of the corresponding HARQ process was not successfully decoded, then start the drx-RetransmissionTimerDL for the corresponding HARQ process.

If a drx-HARQ-RTT-TimerUL expires, then start the drx-RetransmissionTimerUL for the corresponding HARQ process.

If a DRX Command MAC CE or a Long DRX Command MAC CE is received, then stop drx-onDurationTimer and stop drx-InactivityTimer.

If drx-InactivityTimer expires or a DRX Command MAC CE is received and if the Short DRX cycle is configured, then start or restart drx-ShortCycleTimer and use the Short DRX Cycle.

If drx-InactivityTimer expires or a DRX Command MAC CE is received and if the Short DRX cycle is not configured then use the Long DRX cycle.

If drx-ShortCycleTimer expires, use the Long DRX cycle.

If a Long DRX Command MAC CE is received, stop drx-ShortCycleTimer and use the Long DRX cycle.

If the Short DRX Cycle is used, and [(SFN×10)+subframe number] modulo (drx-ShortCycle)=(drx-StartOffset) modulo (drx-ShortCycle); or if the Long DRX Cycle is used, and [(SFN×10)+subframe number] modulo (drx-LongCycle)=drx-StartOffset, if drx-SlotOffset is configured, start drx-onDurationTimer after drx-SlotOffset; else start drx-onDurationTimer.

If the MAC entity is in Active Time, monitor the PDCCH and if the PDCCH indicates a downlink transmission or if a downlink assignment has been configured start the drx-HARQ-RTT-TimerDL for the corresponding HARQ process immediately after the corresponding PUCCH transmission and stop the drx-RetransmissionTimerDL for the corresponding HARQ process. If the PDCCH indicates an uplink transmission start the drx-HARQ-RTT-TimerUL for the corresponding HARQ process immediately after the first repetition of the corresponding PUSCH transmission and stop the drx-RetransmissionTimerUL for the corresponding HARQ process. If the PDCCH indicates a new transmission (downlink or uplink) start or restart drx-InactivityTimer, else (i.e. not part of the Active Time) do not transmit type-0-triggered SRS defined in TS 38.214 [7].

If CQI masking (cqi-Mask) is setup by upper layers, if drx-onDurationTimer is not running, do not report channel state information (CSI) on PUCCH. Else, if the MAC entity is not in Active Time do not report CSI on PUCCH.

Figure 5A:
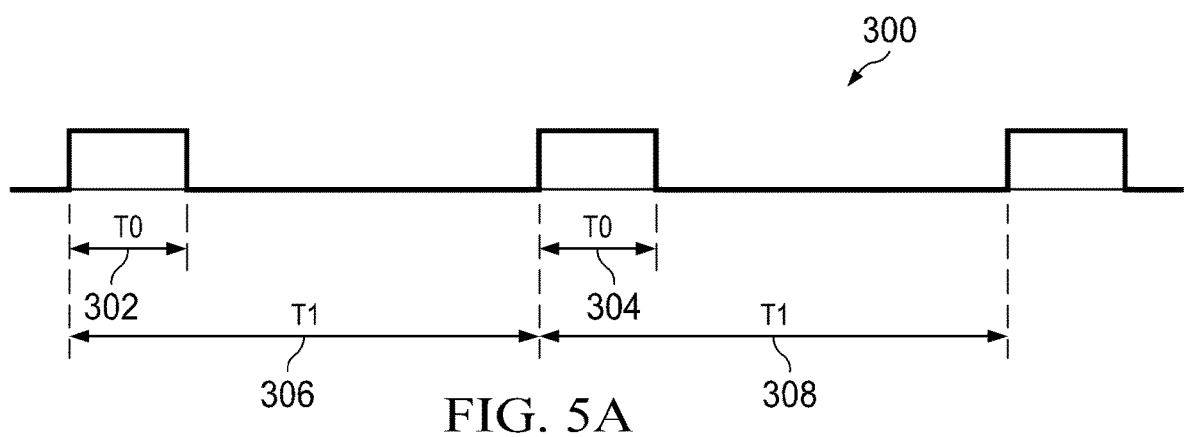
FIGS. 5A-B are diagrams of a DRX cycle operation.
Figure 5B:
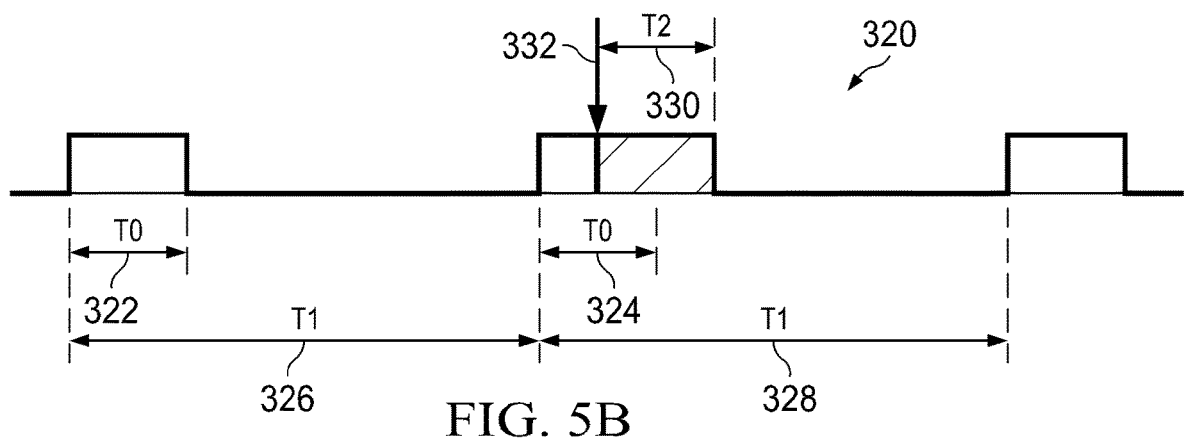

FIGS. 5A-B are a diagram of an embodiment DRX operation 300 and 320 based on the above-mentioned MAC procedure, as may be performed by a UE. A UE switches its state between a DRX ON state and a DRX OFF state. In some embodiments, a DRX ON state may represent a state where a UE is in an Active Time—as previously disclosed. In some embodiments, the DRX ON state may represent a duration at a beginning of a DRX cycle (e.g., drx-onDurationTimer and/or drx-InactivityTimer is running). The DRX state as disclosed herein may apply to either case.

When the UE is in a DRX ON state, the UE monitors a wireless channel for a frame exchange. However, when the UE is in a DRX OFF state, the UE is not required to monitor the wireless channel based on the assumption that a serving base station will not initiate data transmission during the DRX OFF state.

FIG. 5A illustrates a case where a Long DRX Cycle (drx-Long Cycle) is configured and the serving base station does NOT send a downlink control frame over the PDCCH during the DRX ON duration. For each DRX cycle $T_1$ 306 and 308, the UE monitors PDCCH during $T_0$ 302 and 304 until the expiration of the drx-onDurationTimer. At the end of $T_0$ 302 and 304, when drx-onDurationTimer expires, the UE goes to the DRX OFF state again and is not monitoring the wireless medium. Therefore, during Long DRX cycle $T_1$ 306 and 308, the UE monitors the wireless medium during $T_0$ 302 and 304, which may save power consumption at the UE.

FIG. 5B illustrates a case where a Long DRX Cycle (drx-LongCycle) is configured and the serving base station sends a downlink control frame over the PDCCH during the DRX ON duration. For each DRX cycle $T_1$ 326 and 328, the UE monitors the PDCCH during $T_0$ 322 and 324 until the expiration of the drx-onDurationTimer. If a downlink control frame 332 over the PDCCH is detected before the expiration of the drx-onDurationTimer, the UE monitors the wireless medium further during $T_2$ 330 until another timer (drx-InactivityTimer) expires to check any follow up downlink transmissions. When drx-InactivityTimer expires and there is no follow up data exchange, the UE is in the DRX OFF state and not monitoring the wireless medium.

Figure 6:
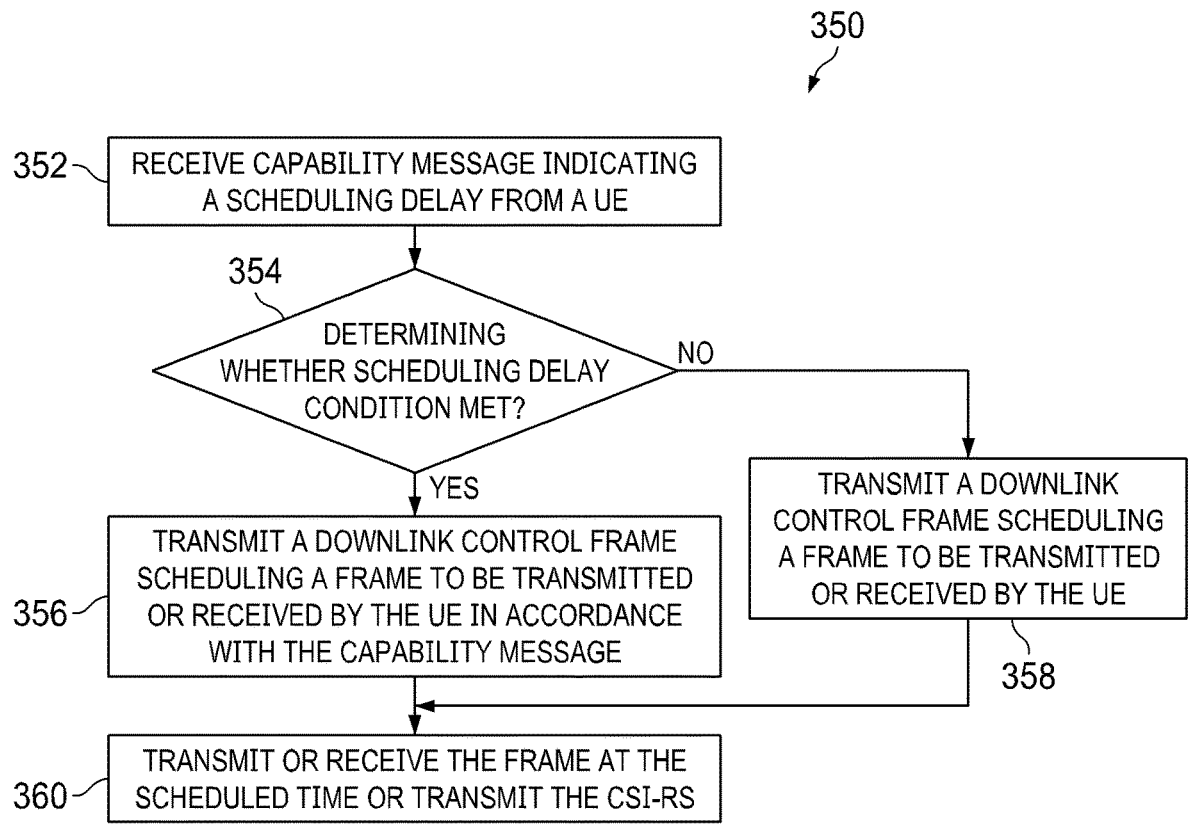
FIG. 6 is a flow diagram of an embodiment operation for scheduling a frame, as may be performed by a base station.

FIG. 6 illustrates a flow diagram of an embodiment operation 350 for scheduling a downlink frame, as may be performed by a base station 110. At step 352, the base station no receives a capability message from a UE. In some embodiments, the capability message may indicate to the base station a scheduling delay for the UE to receive a transmission from the base station. In this embodiment, the scheduling delay may include a time delay for transitioning a receive radio frequency (RF) chain of the UE from an OFF state to an ON state. In some embodiments, the scheduling delay may also include other types of delays, such as a control delay, etc. In other embodiments, the capability message may indicate to the base station a scheduling delay for the UE to transmit a transmission to the base station. In this embodiment, the scheduling delay may include a time delay for transitioning a transmit radio frequency (RF) chain of the UE from an OFF state to an ON state.

The scheduling delay may correspond to a minimum value, which the base station uses for scheduling communications between the UE and the base station. The scheduling may correspond to a time delay greater than the minimum value explicitly indicated in the capability message.

In some embodiments, the capability message may indicate to the base station the application/activation or deactivation of a scheduling delay restriction. The scheduling restriction corresponds to applying a scheduling delay for scheduling communications between the UE and the base station. The scheduling delay value may be a pre-defined value not explicitly communicated to the base station defined, for example, in a standard. In such an embodiment, the capability message indicates to the base station the activation or deactivation of the scheduling delay for purposes of communication scheduling. In some embodiments, the activation or deactivation of the scheduling delay may be communicated in the capability message as a single bit value. For example, a bit value of one (1) may indicate the activation of the scheduling delay and a bit value of zero (0) may indicate the deactivation of the scheduling delay, or vice versa.

In an embodiment, the scheduling delay may correspond to a set of modulation and coding schemes (MCSs). In this embodiment, a scheduled MCS of the frame transmission is within the set of MCSs. In another embodiment, the scheduling delay corresponds to a set of ranks. In this embodiment, a scheduled rank of the scheduled transmission is within the set of ranks. Rank may refer to layers used or a number of different data streams to be transmitted/received simultaneously on the same time and frequency resources by the UE.

At step 354, in response to the base station determining to transmit a frame to the UE, or to receive a frame from the UE, the base station determines whether or not the transmission or reception of the frame satisfies a condition for applying the scheduling delay. The scheduling delay may be satisfied in response to one of the following conditions, or any combination thereof.

In an embodiment, the condition for applying the scheduling delay is satisfied in response to the base station receiving the capability message at step 352. In one embodiment, the condition for applying the scheduling delay is satisfied in response to the base station determining that the frame uses a modulation and coding scheme (MCS) index level that is within a set of MCS index levels. In one embodiment, the condition for applying the scheduling delay is satisfied in response to the base station determining that the frame uses a rank that is within a set of ranks. In one embodiment, the condition for applying the scheduling delay is satisfied in response to the base station determining that for a specific duration of time no data transmissions are scheduled prior to the transmission of the frame by the base station or by the UE. In an embodiment, the condition for applying the scheduling delay is satisfied in response to the UE operating in a DRX mode. The DRX mode based operation may refer to an embodiment where a scheduling delay is applied to an initial frame transmitted or received during the DRX ON period. In another embodiment, the scheduling delay is satisfied in response to the UE operating in a power save mode. In yet another embodiment, the scheduling delay is satisfied in response to the UE operating in a specific bandwidth part (BWP).

In one embodiment, the condition for applying the scheduling delay is satisfied in response to the base station determining that the respective receive RF chain of the UE is turned OFF before the scheduled transmission of the frame by the UE. In one embodiment, the condition for applying the scheduling delay is satisfied in response to the base station determining that the respective transmit RF chain of the UE is turned OFF before the scheduled reception of the frame by the UE. It is noted that in either embodiment, a second receive RF chain of the UE may be in an ON state to receive the downlink control frame.

In one embodiment, the condition for applying the scheduling delay is satisfied in response to the base station requesting a channel state information reference signal (CSI-RS) measurement. Typically, in a CSI measurement, the base station indicates the timing for the CSI-RS to be transmitted, by the base station, in a downlink control channel. The UE completes the measurement, which is then reported to the base station. Accordingly, the scheduling delay may correspond to a time interval between the transmission of the downlink control frame and the CSI-RS transmission from the base station. In this configuration, the CSI-RS is transmitted after the transmission of the scheduling delay. This allows for the UE to utilize all receive RF chains to measure the CSI-RS. In such an embodiment, the scheduling delay may correspond to the time for the CSI-RS and not necessarily for the transmission or reception of a frame at the base station.

In one embodiment, the condition for applying the scheduling delay is satisfied in response to the base station determining that a transmission of the frame to the UE successfully triggers a transition of the receive RF chain of the UE from an OFF state to an ON state. In one embodiment, the condition for applying the scheduling delay is satisfied in response to the base station determining that a transmission of the frame from the UE successfully triggers a transition of the transmit RF chain of the UE from an OFF state to an ON state.

At step 356, if the condition for applying the scheduling delay is satisfied, the base station transmits a downlink control frame to the UE that schedules the transmission or reception of the frame by the UE. The downlink control frame indicates a scheduled time for a reception or transmission of the frame, by the UE. The scheduled time is scheduled by the base station to be greater than or equal to the value indicated by the capability message. The downlink control frame may be transmitted over a PDCCH.

The capability message may also indicate to the base station a time interval to transition an RF chain of the UE from an OFF state to an ON state. In one embodiment, the downlink control frame may instruct the UE to transition the receive RF chain of the UE from the OFF state to the ON state. In another embodiment, the downlink control frame may instruct the UE to transition the transmit RF chain of the UE from the OFF state to the ON state.

In one embodiment, the base station may transmit a first and second downlink control frame to the UE, respectively. The first and second downlink control frame, each scheduling a frame (e.g., first and second frame) to be transmitted or received by the UE. The first downlink control frame instructs the UE to transition a receive or transmit RF chain of the UE from the OFF state to the ON state. In one embodiment, the time interval between transmitting, by the base station, the first downlink control frame and the second downlink control frame is greater than a time interval corresponding to a timer. In a second embodiment, the time interval between transmitting or receiving the first frame and the transmitting of the second downlink control frame is greater than the time interval corresponding to the timer. In a third embodiment, the time interval between transmitting or receiving the first frame and the transmitting or receiving of the second frame is greater than the time interval corresponding to the timer. In a fourth embodiment, the time interval between transmitting the first downlink control frame and the transmitting or receiving of the second frame is greater than the time interval corresponding to the timer. The timer configuration is further explained in reference to FIG. 11.

Otherwise, at step 358, if the transmission of the frame does not satisfy the condition for applying the scheduling delay, the base station transmits a downlink control frame to the UE to schedule the transmission or reception of the frame by the UE.

At step 360, the base station transmits or receives the frame in accordance with the scheduled time. In one embodiment, the frame is transmitted, by the base station to the UE, over a PDSCH. In another embodiment, the frame is received, by the base station from the UE, over a PUSCH. In yet another embodiment corresponding to the CSI-RS, the base station transmits the CSI-RS to the UE.

Figures 7A, 7B:
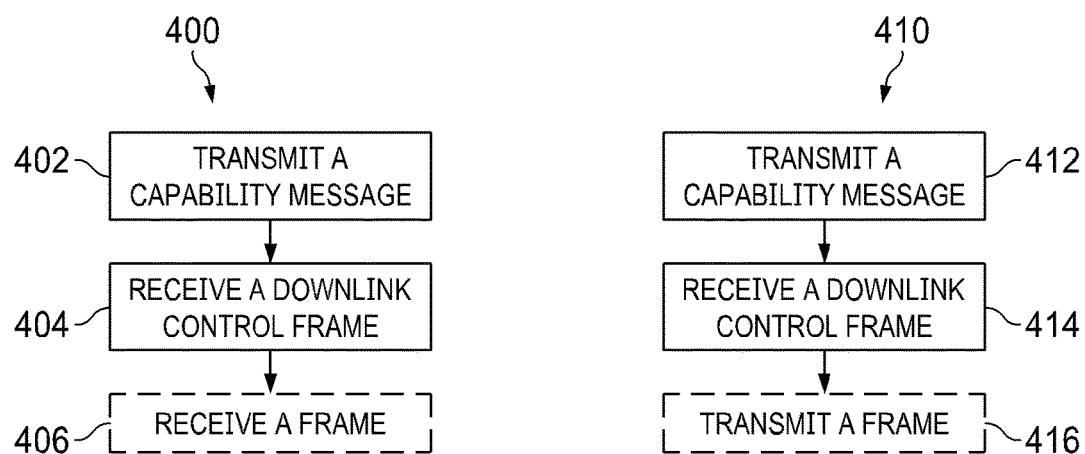
FIGS. 7A-B are flow diagrams of embodiment operations for scheduling a frame, as may be performed by a UE.

FIG. 7A is a flowchart of an embodiment method 400 for an downlink operation, as may be performed by a UE. At step 402, the UE may send a message to the base station using a transmit RF chain. The capability message may indicate a downlink scheduling delay capability of the UE corresponding to a transitioning of a receive RF chain of the UE from an OFF state to an ON state. The capability message may optionally include an uplink scheduling delay capability corresponding to a transition period of a transmit RF chain of the UE to transition from a turned OFF state to a ready to receive state.

A first receive RF chain of the UE remains in an ON state to monitor the PDCCH for a downlink control frame. At step 404, the UE may receive a downlink control frame from the base station over the first receive RF chain. The downlink control frame may be decoded upon receiving. In one embodiment, the downlink control frame indicates to the UE a scheduled time for the reception of a dataframe by the UE. The frame may be received over a second receive RF chain of the UE. The time delay corresponding to the difference in time between the scheduled time for the reception of the data fame and the reception of the downlink control frame is greater than or equal to the scheduling delay indicated in the capability message. In some embodiments, the downlink control frame may also instruct the UE to transition the second receive RF chain of the UE from the OFF state to the ON state upon receiving of the downlink control frame. The downlink control frame may be received by the UE over the PDCCH.

At step 406, the UE receives the frame from the base station over the first and second receive RF chains of the UE in accordance with the scheduled time as indicated in the downlink control frame. The frame may be received over a PDSCH.

FIG. 7B is a flowchart of an embodiment method 410 for an uplink operation, as may be performed by a UE. At step 412, the UE may send a message to the base station using a transmit RF chain of the UE. The capability message may indicate a scheduling delay capability of the UE corresponding to a transitioning of the transmit RF chain of the UE from an OFF state to an ON state. The capability message may optionally also include a receive RF chain transition period from a turned OFF state to a ready to receive state. In some embodiments, the transmit RF chain, after transmitting the capability message, may transition from the ON state to the OFF state.

A receive RF chain of the UE remains in an ON state to monitor the PDCCH for a downlink control frame. At step 414, the UE may receive a downlink control frame from the base station over the receive RF chain. The downlink control frame may be decoded upon receiving. In one embodiment, the downlink control frame indicates to the UE a scheduled time for a transmission of a frame by the UE. The frame may be transmitted over the transmit RF chain of the UE used to transmit the capability message at step 412. However, in other embodiments, the transmit RF chain may be a different transmit RF chain of the UE. The time delay corresponding to the difference in time between the scheduled time for transmission of the data frame and the reception of the downlink control frame is greater than or equal to the scheduling delay indicated in the capability message. In some embodiments, the downlink control frame may also instruct the UE to transition the transmit RF chain of the UE from the OFF state to the ON state upon receiving of the downlink control frame. The downlink control frame may be received by the UE over the PDCCH.

At step 416, the UE transmits the frame to the base station over the transmit RF chain of the UE in accordance with the time delay indicated in the downlink control frame. The frame may be transmitted over a PUSCH.

Figure 8:
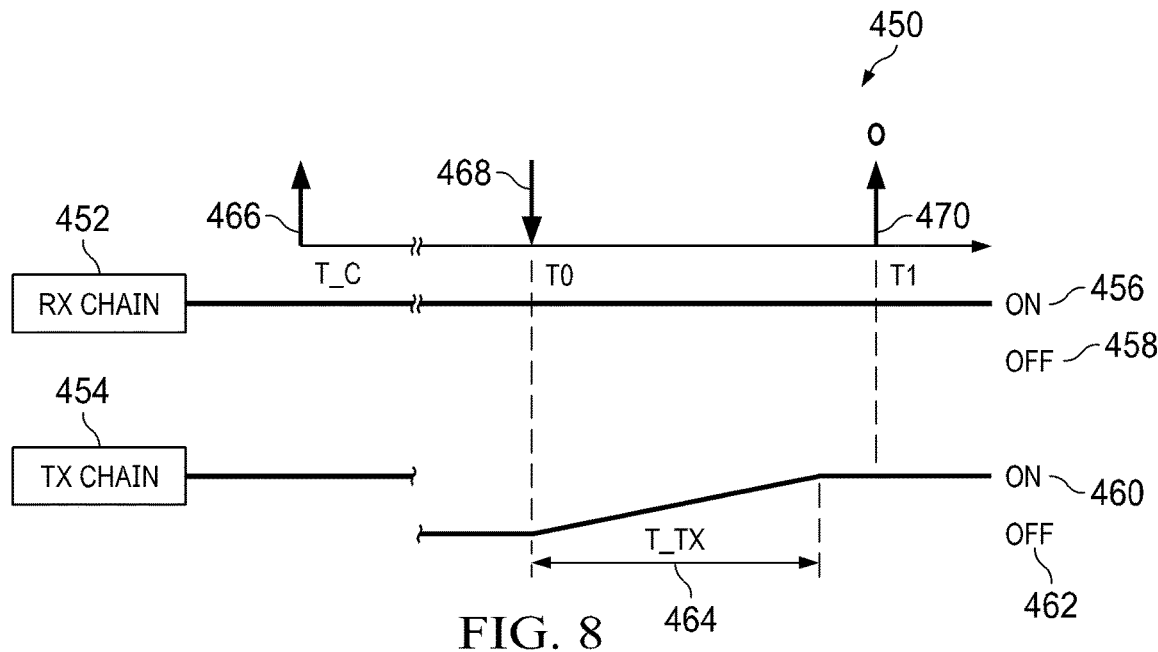
FIG. 8 is a diagram of an embodiment timeline operation for scheduling a data transmission.

FIG. 8 illustrates a diagram of an embodiment timing diagram 450 for scheduling a frame to be transmitted by the UE, in accordance with the embodiment methods disclosed. The UE includes a receive RF chain 452 and a transmit RF chain 454. In a normal operating state, the receive RF chain 452 is in an ON state 456. This allows the UE to monitor the downlink control channel for a downlink control frame.

At time T_C 466, the transmit RF chain 454 is in an ON state 460, at which the UE transmits the capability message to a serving base station. The capability message indicates to the base station a scheduling delay for transmission of data from the UE to the base station. The scheduling delay may indicate a timing delay to transition a transmit RF chain of the UE from an OFF state to an ON state.

After transmitting the capability message, the transmit RF chain 454 transitions from the ON state 460 to the OFF state 462 to conserve power. It is noted that the transmit RF chain 454 has a time delay T_TX 464 for transitioning from an OFF state 462 to the ON state 460.

At time $T_0$ 468, the UE receives a downlink control frame over the downlink control channel indicating to the UE to schedule a transmission from the UE to the base station, for example, at time $T_1$ 470. The time $T_1$ 470 is scheduled to be greater than or equal to time $T_0+T\_Tx$ in accordance with the capability message.

The UE, upon receiving the downlink control frame at time $T_0$ 468, decodes the downlink control frame and in accordance with the decoded message, turns the transmit RF chain 454 from the OFF state 462 to the ON state 460. At time $T_0+T\_Tx$, the UE is ready to transmit over the transmit RF chain 454. At Time $T_1$ 470, the UE transmits the data in accordance with the scheduled time indicated in the downlink control frame.

In some embodiments, the capability message and the frame to be transmitted by the UE may be on the same transmit RF chain 454. However, in other embodiments, the capability message transmitted at time T_C and the frame scheduled to be transmitted at time $T_1$ 470 may be transmitted by the UE over different transmit RF chains of the UE.

Figure 9:
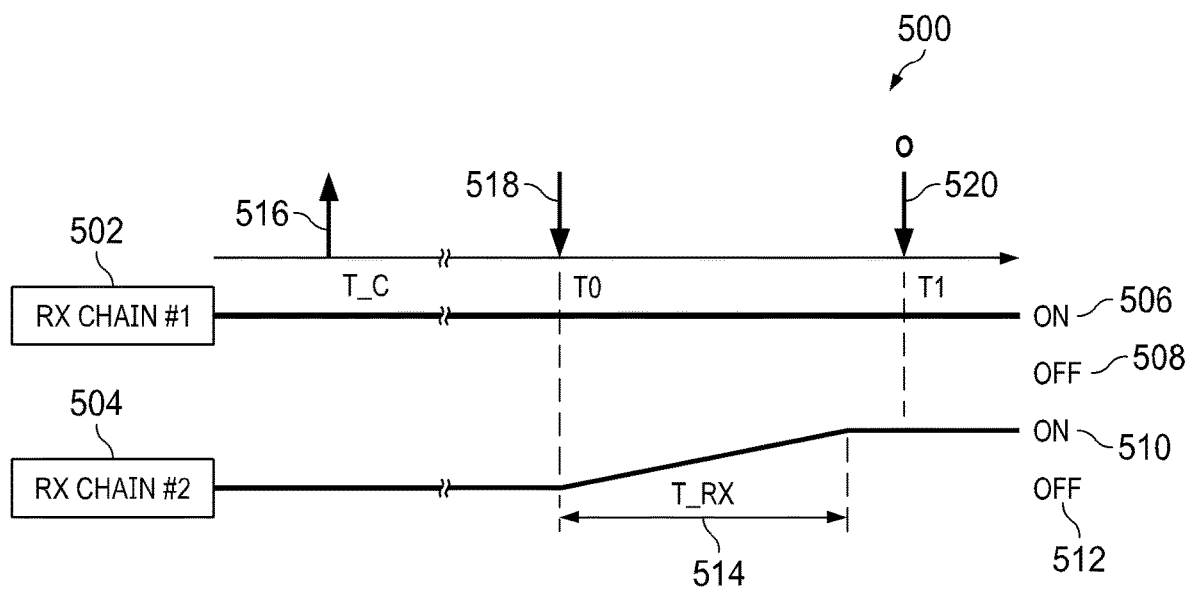
FIG. 9 is a diagram of another embodiment timeline operation for scheduling a data transmission.

FIG. 9 illustrates a diagram of an embodiment timing diagram 500 for scheduling a frame to be received by the UE, in accordance with the embodiment methods disclosed. The UE includes a first receive RF chain 502 and a second receive RF chain 504. In a normal operating state, the first receive RF chain 502 is in an ON state 506. This allows for the UE to monitor the downlink control channel for a downlink control frame. The second receive RF chain 504 is in an OFF state 512 to conserve power.

At time T_C 516, the UE transmits a capability message to a serving base station over a transmit RF chain (not shown) of the UE. The capability message indicates to the base station a scheduling delay for reception of data from the UE to the base station over the second receive RF chain 504. The scheduling delay may indicate a timing delay to transition the second receive RF chain of the UE from an OFF state to an ON state. It is noted that the second receive RF chain 504 has a time delay T_RX 514 to transition from an OFF state 512 to the ON state 510.

At time $T_0$ 518, the UE receives a downlink control frame over the downlink control channel indicating to the UE to schedule a reception of data from the base station to the UE, for example, at time $T_1$ 520. The time $T_1$ 520 is scheduled to be greater than or equal to time $T_0$+T_Rx in accordance with the capability message.

The UE, upon receiving the downlink control frame at time $T_0$ 518, decodes the downlink control frame and in accordance with the decoded message, turns the second receive RF chain 504 from the OFF state 512 to the ON state 510. At time $T_0$+T_Rx, the UE is ready to receive over the second receive RF chain 504. At Time $T_1$ 520, the UE receives the data in accordance with the scheduled time indicated in the downlink control frame over the first receive RF chain 502 and the second receive RF chain 504.

Figure 10:
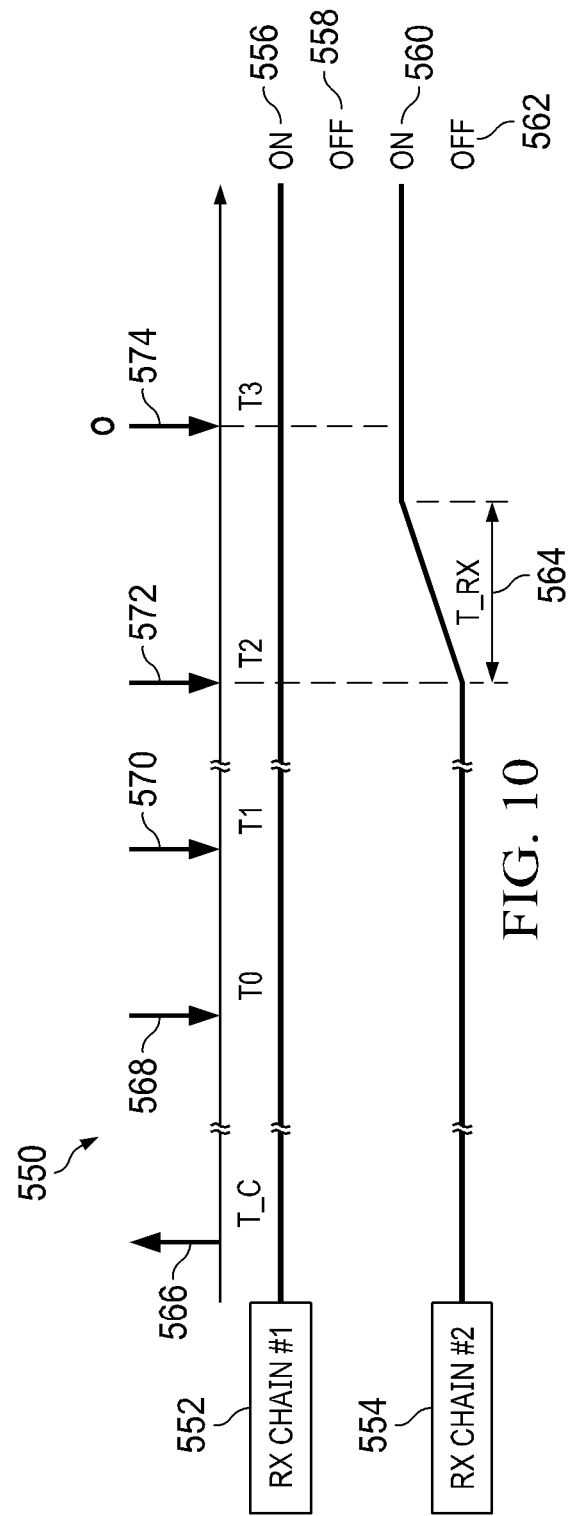
FIG. 10 is a diagram of yet another embodiment timeline operation for scheduling a data transmission.

FIG. 10 illustrates a diagram of another embodiment timing diagram 550 for scheduling frames to be received by the UE, in accordance with embodiment methods disclosed. The UE includes a first receive RF chain 552 and a second receive RF chain 554. In a normal operating state, the first receive RF chain 552 is in an ON state 556. This allows the UE to monitor the downlink control channel for a downlink control frame. The second receive RF chain 554 is in an OFF state 562 to conserve power. Initially, the second receive RF chain 554 transitions to an ON state 562 in response to a downlink transmission with a rank of two (2) or higher. It is noted that the second receive RF chain 554 has a time delay T_RX 564 to transition from an OFF state 562 to the ON state 560 for a rank two (2) transmission.

At time T_C 566, the UE transmits a capability message to a serving base station over a transmit RF chain (not shown) of the UE. The capability message indicates to the base station a scheduling delay for reception of data by the UE from the base station. The scheduling delay corresponds to a reception of data over the second receive RF chain 554 of the UE when the downlink transmission has a rank of two (2) or higher. The scheduling delay may indicate a timing delay to transition the second receive RF chain 554 of the UE from an OFF state 562 to an ON state 560.

At time $T_0$ 568, the UE receives a first downlink control frame over the downlink control channel indicating to the UE to schedule a reception of data from the base station to the UE, for example, at time $T_1$ 570 where the transmission rank of the downlink transmission is one (1). As the transmission rank of the downlink transmission is one (1), the second receive RF chain 554 remains in the OFF state 562. The UE receives the downlink transmission at time $T_1$ 570 over the first receive RF chain 552.

At time $T_2$ 572, the UE receives a second downlink control frame over the downlink control channel indicating to the UE to schedule a reception of data from the base station to the UE, for example, at time $T_3$ 574 where the transmission rank of the downlink transmission is two (2). As the transmission rank of the downlink transmission is two (2), the second receive RF chain 554 transitions from the OFF state 562 to the ON state 560 after decoding the second downlink control frame. The capability message transmitted at time T_C 566 includes the scheduling delay of the UE for the second receive RF chain 554 for a downlink transmission rank of 2 or higher. Therefore, the time $T_3$ 574 is scheduled to be greater than or equal to time $T_2$+T_Rx. The UE then receives the downlink transmission at time $T_3$ 574 over the first and second receive RF chains 552 and 554, respectively.

Figure 11:
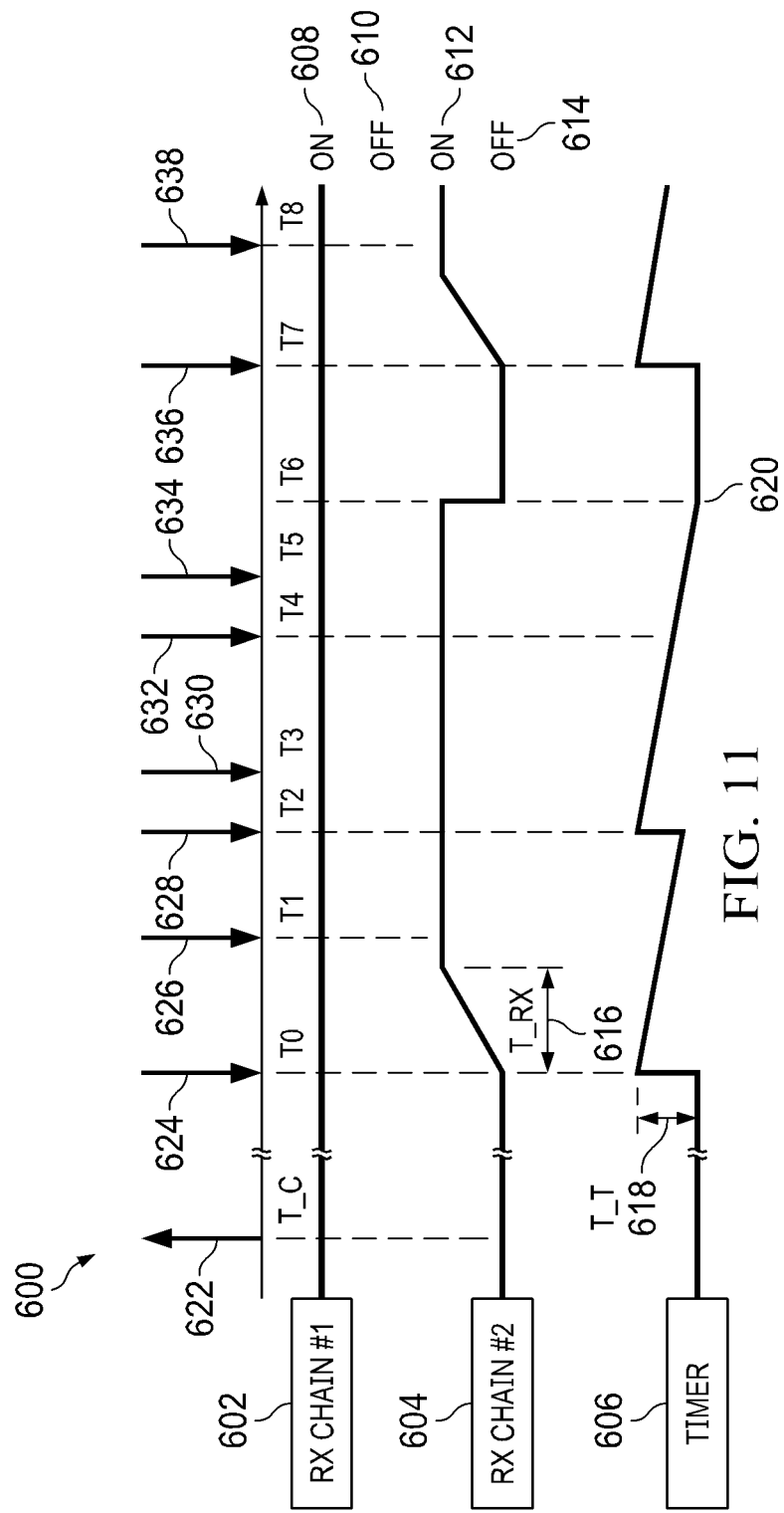
FIG. 11 is a diagram of an embodiment timeline operation for scheduling a data transmission for a UE with a timer.

FIG. 11 illustrates a diagram of another embodiment timing operation diagram 600. The UE includes a first receive RF chain 602 and a second receive RF chain 604. In a normal operating state, the first receive RF chain 602 is in an ON state 608. This allows for the UE to monitor the downlink control channel for a downlink control frame. Initially, the second receive RF chain 604 is in an OFF state 614 to conserve power. The second receive RF chain 604 transitions to an ON state 612 in response to a downlink transmission with a rank of two (2) or higher. It is noted that the second receive RF chain 604 has a time delay T_RX 616 to transition from an OFF state 614 to the ON state 612 for a rank two (2) transmission. In addition, the UE maintains a timer 606 to control the state of the second receive RF chain 604.

At time T_C 622, the UE transmits a capability message to a serving base station over a transmit RF chain (not shown) of the UE. The capability message indicates to the base station a scheduling delay for reception of data by the UE from the base station. The scheduling delay corresponds to a reception of data over the second receive RF chain 604 when the downlink transmission has a rank of two (2) or higher. The scheduling delay may indicate a timing delay to transition the second receive RF chain 604 of the UE from an OFF state 614 to an ON state 612.

At time $T_0$ 624, the UE receives a first downlink control frame over the downlink control channel indicating to the UE to schedule a reception of data from the base station to the UE, for example, at time $T_1$ 626 where the transmission rank of the downlink transmission is two (2). Prior to receiving the first downlink control frame, the timer 606 is expired. As the transmission rank of the downlink transmission is two (2) and the timer 606 is expired, the second receive RF chain 604 transitions from the OFF state 614 to the ON state 612 after decoding the first downlink control frame. Additionally, the UE sets the timer 606 to time T_T 618. The capability message transmitted at time T_C 622 includes the scheduling delay of the UE for the second receive RF chain 604 for a downlink transmission rank of 2 or higher. Therefore, the time $T_1$ 624 is scheduled to be at time corresponding to a delay greater than or equal to time $T_0$+T_Rx from receiving the downlink control frame. The UE then receives the downlink transmission at time $T_1$ 624 over the first and second receive RF chains 602 and 604, respectively.

At time $T_2$ 628, the UE receives a second downlink control frame over the downlink control channel indicating to the UE to schedule a reception of data from the base station to the UE, for example, at time $T_3$ 630 where the transmission rank of the downlink transmission is two (2). As the downlink transmission having a rank two (2) uses two receive RF chains, the UE restarts the timer from T_T 618. The base station is aware that the second receive RF chain 604 is still in the ON state 612 and the base station does not need to set a scheduling delay between time $T_2$ 628 and time $T_3$ 630 that is greater than time T_RX 616. The UE then receives the downlink transmission at time $T_3$ 630 over the first and second receive RF chains 602 and 604, respectively.

At time $T_4$ 632, the UE receives a third downlink control frame over the downlink control channel indicating to the UE to schedule a reception of data from the base station to the UE, for example, at time $T_5$ 634 where the transmission rank of the downlink transmission is one (1). The UE then receives the downlink transmission at time $T_5$ 634 over the first receive RF chain 602. As a downlink transmission with a rank of one (1) can be completed with a single receive RF chain, the UE continues with the timer 606 (i.e., does not reset the timer). Therefore, at time $T_6$ 620, the timer value expires, which in turn results in the second receive RF chain 604 to transition from the ON state 612 to the OFF state 614.

At time $T_7$ 636, the UE receives a fourth downlink control frame over the downlink control channel indicating to the UE to schedule a reception of data from the base station to the UE, for example, at time $T_8$ 638 where the transmission rank of the downlink transmission is two (2). The UE operates similarly to the receiving of the first downlink control channel at time $T_0$ 624. The UE sets the timer 606 to a period of time T_T 618 and the second receive RF chain 604 transitions from the OFF state 614 to the ON state 612. The UE then receives the frame at time $T_8$ 638 over the first and second receive RF chains 602 and 604, respectively. The time $T_8$ 638 is scheduled to be at a time corresponding to a delay greater than or equal to time $T_7$+T_Rx from receiving the downlink control frame.

Figure 12:
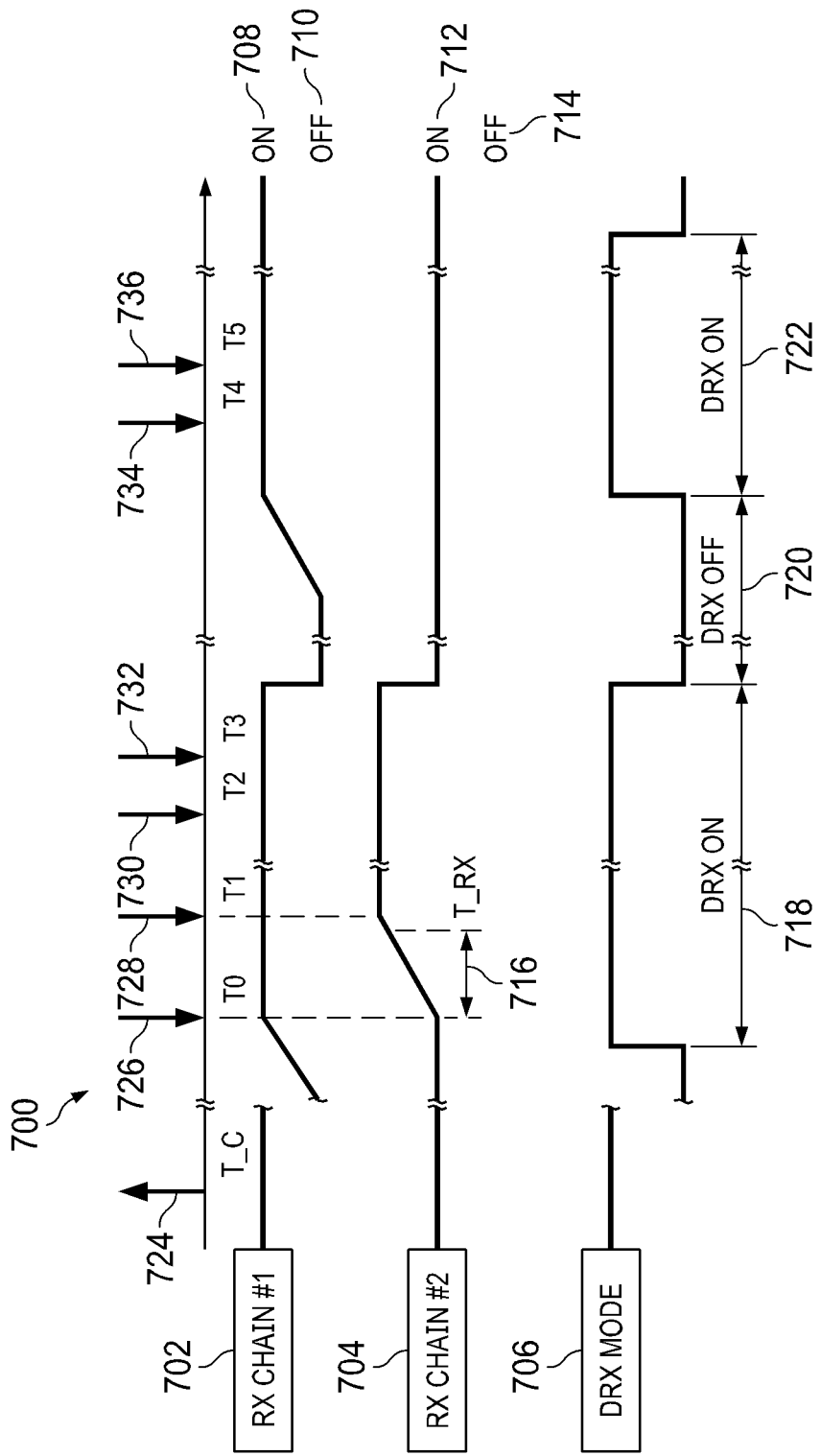
FIG. 12 is a diagram of an embodiment timeline operation for scheduling a data transmission for a UE having a DRX mode.

FIG. 12 illustrates a diagram of an embodiment timing operation diagram 700 in accordance with a DRX cycle. The UE includes a first receive RF chain 702 and a second receive RF chain 704. In a DRX OFF state, both first and second receive RF chains 702 and 704 are in the OFF state 710 and 714, respectively. In a DRX ON state, the first receive RF chain 702 is in an ON state 708 to monitor the downlink control channel for a downlink control frame; the second receive RF chain 704 transitions to an ON state 712 in response to a downlink transmission with a rank two (2) or higher. Initially, the second receive RF chain 704 is in an OFF state 714 to conserve power. It is noted that the second receive RF chain 704 has a time delay T_RX 716 to transition from an OFF state 714 to the ON state 712 for a rank two (2) transmission.

At time T_C 724, the UE transmits a capability message to a serving base station over a transmit RF chain (not shown) of the UE. The capability message indicates to the base station a scheduling delay for reception of data by the UE from the base station. The scheduling delay corresponds to a reception of the data by the UE over the second receive RF chain 704 when the downlink transmission has a rank of two (2) or higher. The scheduling delay may indicate a timing delay to transition the second receive RF chain 704 of the UE from an OFF state 714 to an ON state 712.

At time $T_0$ 726, as the DRX mode is in an ON state 718, the UE receives a first downlink control frame over the downlink control channel indicating to the UE to schedule a reception of data from the base station to the UE, for example, at time $T_1$ 728 where the transmission rank of the downlink transmission is two (2). The capability message transmitted at time T_C 724 includes the scheduling delay of the UE for the second receive RF chain 704 for a downlink transmission rank of 2 or higher. As the transmission rank of the downlink transmission is two (2), the second receive RF chain 704 transitions from the OFF state 714 to the ON state 712 after decoding the first downlink control frame. Therefore, the time $T_1$ 728 is scheduled to be greater than or equal to time $T_0$+T_Rx. The UE then receives the downlink transmission at time $T_1$ 728 over the first and second receive RF chains 702 and 704, respectively. It is noted that the second receive RF chain 704 remains in the ON state 712 throughout the DRX ON state 718.

At time $T_2$ 730, the UE receives a second downlink control frame over the downlink control channel indicating to the UE to schedule a reception of data from the base station, for example, at time $T_3$ 732 where the transmission rank of the downlink transmission is two (2). The base station is aware that the second receive RF chain 704 is still in the ON state 712 and does not need to set a scheduling delay between time $T_2$ 730 and time $T_3$ 732 that is greater than time T_RX 716. The UE then receives the downlink transmission at time $T_3$ 732 over the first and second receive RF chains 702 and 704, respectively.

At the end of the DRX ON state 718 and during the DRX OFF state 720, both receive RF chains are in the OFF state 710 and 714, respectively. At the beginning of the DRX ON state 722, the first receive RF chain 702 transitions from the OFF state 710 to the ON state 708 to monitor the downlink control channel for a downlink control frame.

At time $T_4$ 734, the UE receives a third downlink control frame over the downlink control channel indicating to the UE to schedule a reception of data from the base station, for example, at time $T_5$ 736 where the transmission rank of the downlink transmission is one (1). As a downlink transmission with a rank of one (1) can be completed with a single receive RF chain, the second receive RF chain 704 remains in the OFF state 714. The UE then receives the downlink transmission at time $T_5$ 736 over the first receive RF chain 702.

Without loss of generality, it is noted that even though some of the example embodiments above explain the operation of one or more receive RF chains for downlink transmissions, similar mechanisms may be applied to one or more transmit RF chains for uplink transmission from a UE. It is also noted that even though some of the example embodiments above explain the proposed operation under a general DRX operation case, similar mechanisms may be applied to the case when DRX operation includes both Long DRX cycles and Short DRX cycles or to the case when DRX operation includes Long DRX cycles.

Figure 13:
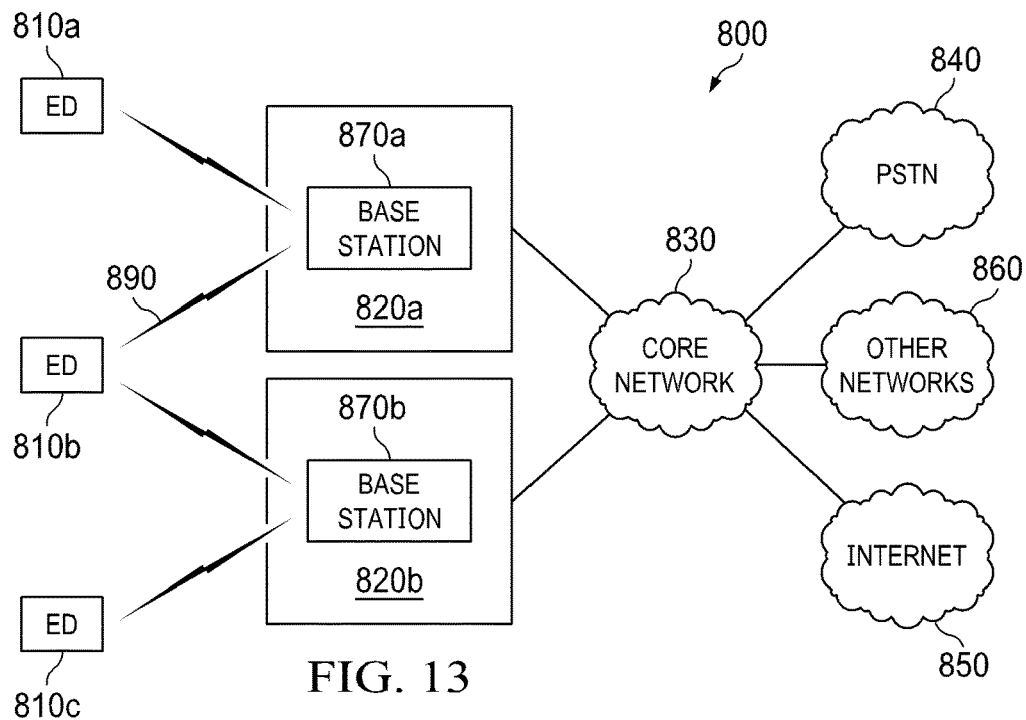
FIG. 13 illustrates an embodiment communication system.

FIG. 13 illustrates an example communication system 800. In general, the system 800 enables multiple wireless or wired users to transmit and receive data and other content. The system 800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA). In this example, the communication system 800 includes electronic devices (ED) 810a-810c, radio access networks (RANs) 820a-820b, a core network 830, a public switched telephone network (PSTN) 840, the Internet 850, and other networks 860. While certain numbers of these components or elements are shown in FIG. 8, any number of these components or elements may be included in the system 800. The EDs 810a-810c are configured to operate or communicate in the system 800. For example, the EDs 810a-810c are configured to transmit or receive via wireless or wired communication channels. Each ED 810a-810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device. The RANs 820a-820b here include base stations 870a-870b, respectively. Each base station 870a-870b is configured to wirelessly interface with one or more of the EDs 810a-810c to enable access to the core network 830, the PSTN 840, the Internet 850, or the other networks 860. For example, the base stations 870a-870b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 810a-810c are configured to interface and communicate with the Internet 850 and may access the core network 830, the PSTN 840, or the other networks 860. In the embodiment shown in FIG. 8, the base station 870a forms part of the RAN 820a, which may include other base stations, elements, or devices. Also, the base station 870b forms part of the RAN 820b, which may include other base stations, elements, or devices. Each base station 870a-870b operates to transmit or receive wireless signals within a particular geographic region or area, sometimes referred to as a "cell." In some embodiments, multiple-input multiple-output (MIMO) technology may be employed having multiple transceivers for each cell. The base stations 870a-870b communicate with one or more of the EDs 810a-810c over one or more air interfaces 890 using wireless communication links. The air interfaces 890 may utilize any suitable radio access technology. It is contemplated that the system 800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized. The RANs 820a-820b are in communication with the core network 830 to provide the EDs 810a-810c with voice, data, application, Voice over Internet Protocol (VoIP), or other services. Understandably, the RANs 820a-820b or the core network 830 may be in direct or indirect communication with one or more other RANs (not shown). The core network 830 may also serve as a gateway access for other networks (such as the PSTN 840, the Internet 850, and the other networks 860). In addition, some or all of the EDs 810a-810c may include functionality for communicating with different wireless networks over different wireless links using different wireless technologies or protocols. Instead of wireless communication (or in addition thereto), the EDs may communicate via wired communication channels to a service provider or switch (not shown), and to the Internet 850. Although FIG. 8 illustrates one example of a communication system, various changes may be made to FIG. 8. For example, the communication system 800 could include any number of EDs, base stations, networks, or other components in any suitable configuration.

Figure 14A:
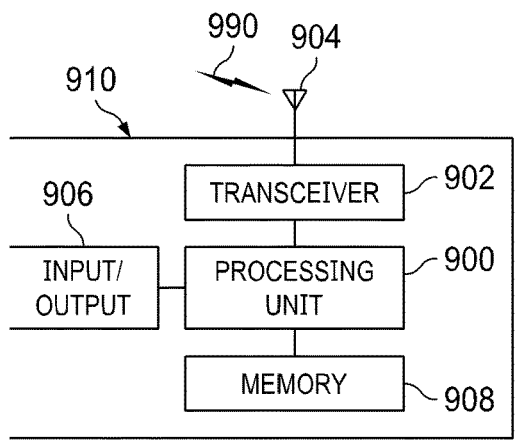
FIG. 14A is an embodiment electronic device.
Figure 14B:
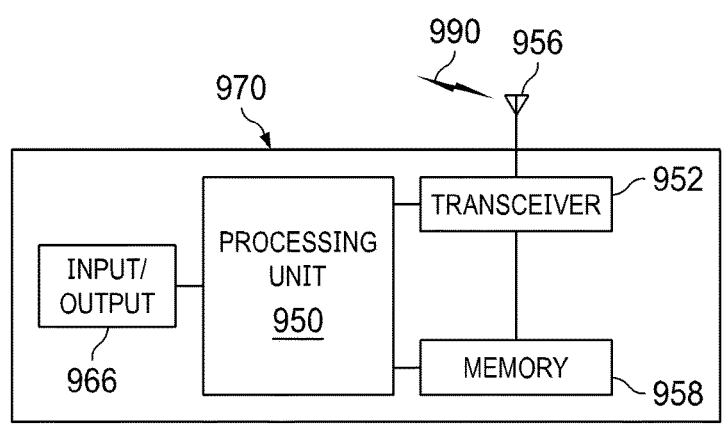
FIG. 14B is an embodiment base station.

FIGS. 14A and 14B illustrate example devices that may implement the methods and teachings according to this disclosure. In particular, FIG. 14A illustrates an example ED 910, and FIG. 14B illustrates an example base station 970. These components could be used in the system 800 or in any other suitable system.

As shown in FIG. 14A, the ED 910 includes at least one processing unit 900. The processing unit 900 implements various processing operations of the ED 910. For example, the processing unit 900 could perform signal coding, data processing, power control, input/output processing, or any other functionality enabling the ED 910 to operate in the system 800. The processing unit 900 also supports the methods and teachings described in more detail above. Each processing unit 900 includes any suitable processing or computing device configured to perform one or more operations. Each processing unit 900 could, for example, include a microprocessor, a microcontroller, a digital signal processor, a field programmable gate array (FPGA), or an application specific integrated circuit (ASIC). The ED 910 also includes at least one transceiver 902. The transceiver 902 is configured to modulate data or other content for transmission by at least one antenna or Network Interface Controller (NIC) 904. The transceiver 902 is also configured to demodulate data or other content received by the at least one antenna 904. Each transceiver 902 includes any suitable structure for generating signals for wireless or wired transmission or processing signals received wirelessly or by wire. Each antenna 904 includes any suitable structure for transmitting or receiving wireless or wired signals. One or multiple transceivers 902 could be used in the ED 910, and one or multiple antennas 904 could be used in the ED 910. Although shown as a single functional unit, a transceiver 902 could also be implemented using at least one transmitter and at least one separate receiver. The ED 910 further includes one or more input/output devices 906 or interfaces (such as a wired interface to the Internet 850). The input/output devices 906 facilitate interaction with a user or other devices (network communications) in the network. Each input/output device 906 includes any suitable structure for providing information to or receiving information from a user, such as a speaker, microphone, keypad, keyboard, display, or touch screen, including network interface communications. In addition, the ED 910 includes at least one memory 908. The memory 908 stores instructions and data used, generated, or collected by the ED 910. For example, the memory 908 could store software or firmware instructions executed by the processing unit(s) 900 and data used to reduce or eliminate interference in incoming signals. Each memory 908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. As shown in FIG. 14B, the base station 970 includes at least one processing unit 950, at least one transceiver 952, which includes functionality for a transmitter and a receiver, one or more antennas 956, at least one memory 958, and one or more input/output devices or interfaces 966. A scheduler, which would be understood by one skilled in the art, is coupled to the processing unit 950. The scheduler could be included within or operated separately from the base station 970. The processing unit 950 implements various processing operations of the base station 970, such as signal coding, data processing, power control, input/output processing, or any other functionality. The processing unit 950 can also support the methods and teachings described in more detail above. Each processing unit 950 includes any suitable processing or computing device configured to perform one or more operations. Each processing unit 950 could, for example, include a microprocessor, a microcontroller, a digital signal processor, a field programmable gate array (FPGA), or an application specific integrated circuit (ASIC). Each transceiver 952 includes any suitable structure for generating signals for wireless or wired transmission to one or more EDs or other devices. Each transceiver 952 further includes any suitable structure for processing signals received wirelessly or by wire from one or more EDs or other devices. Although shown combined as a transceiver 952, a transmitter and a receiver could be separate components. Each antenna 956 includes any suitable structure for transmitting or receiving wireless or wired signals. While a common antenna 956 is shown here as being coupled to the transceiver 952, one or more antennas 956 could be coupled to the transceiver(s)

952, allowing separate antennas 956 to be coupled to the transmitter and the receiver if equipped as separate components. Each memory 958 includes any suitable volatile or non-volatile storage and retrieval device(s). Each input/output device 966 facilitates interaction with a user or other devices (network communications) in the network. Each input/output device 966 includes any suitable structure for providing information to or receiving/providing information from a user, including network interface communications.

Figure 15:
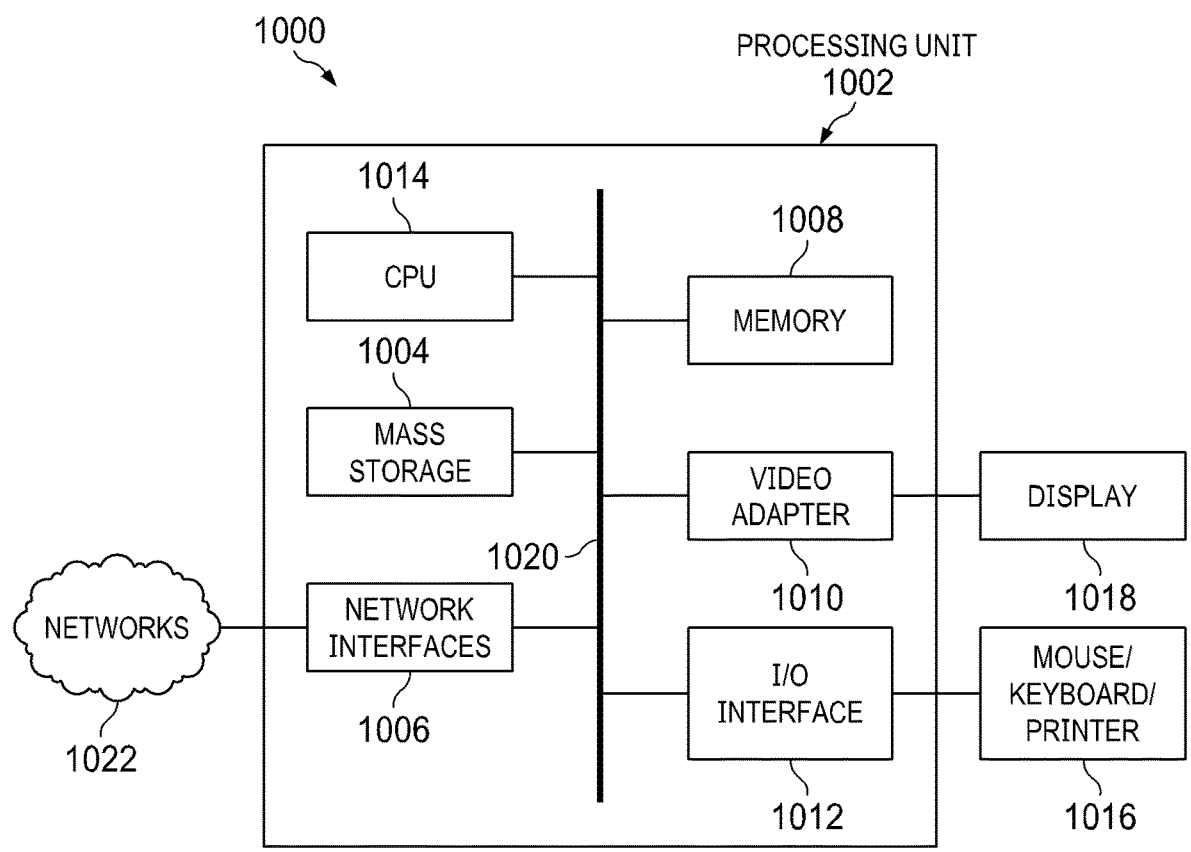
FIG. 15 is a diagram of an embodiment computing system.

FIG. 15 is a block diagram of a computing system 1000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020. The bus 1020 may be one or more of any type of several bus architectures including a memory bus or memory controller, a peripheral bus, or a video bus. The CPU 1014 may include any type of electronic data processor. The memory 1008 may include any type of non-transitory system memory such as static random access memory (SRAM), dynamic random access memory (DRAM), synchronous DRAM (SDRAM), read-only memory (ROM), or a combination thereof. In an embodiment, the memory 1008 may include ROM for use at boot-up, and DRAM for program and data storage for use while executing programs. The mass storage 1004 may include any type of non-transitory storage device configured to store data, programs, and other information and to make the data, programs, and other information accessible via the bus 1020. The mass storage 1004 may include, for example, one or more of a solid-state drive, hard disk drive, a magnetic disk drive, or an optical disk drive. The video adapter 1010 and the I/O interface 1012 provide interfaces to couple external input and output devices to the processing unit 1002. As illustrated, examples of input and output devices include a display 1018 coupled to the video adapter 1010 and a mouse, keyboard, or printer 1016 coupled to the I/O interface 1012. Other devices may be coupled to the processing unit 1002, and additional or fewer interface cards may be utilized. For example, a serial interface such as Universal Serial Bus (USB) (not shown) may be used to provide an interface for an external device. The processing unit 1002 also includes one or more network interfaces 1006, which may include wired links, such as an Ethernet cable, or wireless links to access nodes or different networks. The network interfaces 1006 allow the processing unit 1002 to communicate with remote units via the networks. For example, the network interfaces 1006 may provide wireless communication via one or more transmitters/transmit antennas and one or more receivers/receive antennas. In an embodiment, the processing unit 1002 is coupled to a local-area network 1022 or a wide-area network for data processing and communications with remote devices, such as other processing units, the Internet, or remote storage facilities. It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a reporting unit or module, an incrementing unit or module, a declaring unit or module, an updating unit or module, a resetting unit or module, a detecting unit or module, or a monitoring unit or module. The respective units or modules may be hardware, software, or a combination thereof. For instance, one or more of the units or modules may be an integrated circuit, such as field programmable gate arrays (FPGAs) or application-specific integrated circuits (ASICs).

Figure 16:
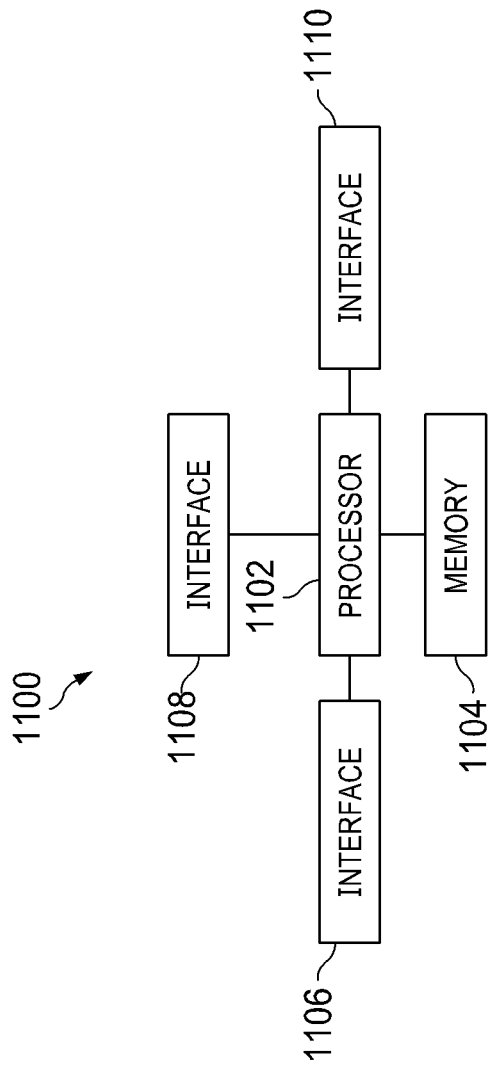
FIG. 16 is a diagram of an embodiment processing system.

FIG. 16 illustrates a block diagram of an embodiment processing system 1100 for performing methods described herein, which may be installed in a host device. As shown, the processing system 1100 includes a processor 1102, a memory 1104, and interfaces 1106, 1108, 1110 which may (or may not) be arranged as shown in FIG. 16. The processor 1102 may be any component or collection of components adapted to perform computations and/or other processing related tasks, and the memory 1104 may be any component or collection of components adapted to store programming and/or instructions for execution by the processor 1102. In an embodiment, the memory 1104 includes a non-transitory computer readable medium. The interfaces 1106, 1108, 1110 may be any component or collection of components that allow the processing system 1100 to communicate with other devices/components and/or a user. For embodiment, one or more of the interfaces 1106, 1108, 1110 may be adapted to communicate data, control, or management messages from the processor 1102 to applications installed on the host device and/or a remote device. As another embodiment, one or more of the interfaces 1106, 1108, 1110 may be adapted to allow a user or user device (e.g., personal computer (PC), etc.) to interact/communicate with the processing system 1100. The processing system 1100 may include additional components not depicted in FIG. 16, such as long-term storage (e.g., non-volatile memory, etc.).

In some embodiments, the processing system 1100 is included in a network device that is accessing, or part otherwise of, a telecommunications network. In one embodiment, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 17:
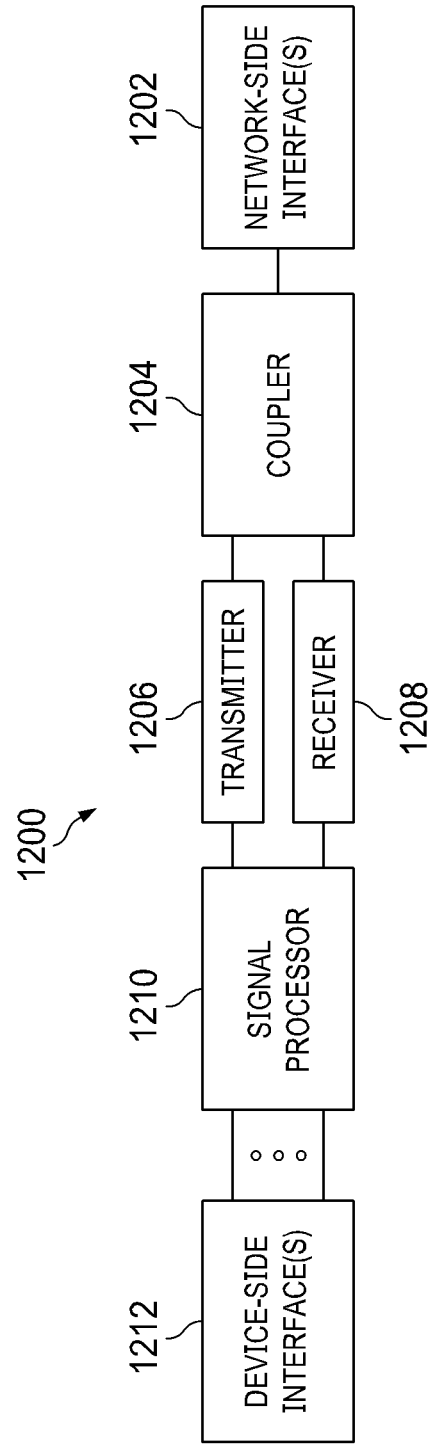
FIG. 17 is a diagram of an embodiment transceiver.

In some embodiments, one or more of the interfaces 1106, 1108, 1110 connects the processing system 1100 to a transceiver adapted to transmit and receive signaling over the telecommunications network. FIG. 17 illustrates a block diagram of a transceiver 1200 adapted to transmit and receive signaling over a telecommunications network. The transceiver 1200 may be installed in a host device. As shown, the transceiver 1200 includes a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. In some embodiments, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 includes one or more antenna/radiating elements. In some embodiments, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

A receive radio frequency (RF) chain, a receive chain, a receive paths disclosure implies a RF chain for a receive path and/or a RF and a digital circuit related to a receive path interchangeably. Similarly, a transmit chain or a transmit path in this disclosure implies a RF chain for a transmit path and/or a RF and a digital circuit related to a transmit path interchangeably. A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for scheduling a wireless communication, the method comprising:
    receiving, by a base station, a capability message from a user equipment (UE), the capability message indicating a scheduling delay for the UE to receive a transmission from the base station;
    transmitting, by the base station, a downlink control frame to the UE, the downlink control frame indicating a scheduled time for a reception of a data frame by the UE, wherein a time delay between the scheduled time and reception time of the downlink control frame is greater than or equal to the scheduling delay, and wherein the scheduling delay includes a second time delay for transitioning a receive radio frequency (RF) chain of the UE from an OFF state to an ON state; and
    transmitting, by the base station, the data frame over a physical downlink shared channel (PDSCH) to the UE in accordance with the scheduled time.

2. The method of claim 1, wherein the scheduling delay corresponds to a set of modulation and coding schemes (MCSs), and wherein a scheduled MCS of a corresponding frame transmission is within the set of MCSs.

3. The method of claim 1, wherein the scheduling delay corresponds to a set of ranks, and wherein a scheduled rank of a corresponding frame transmission is within the set of ranks.

4. The method of claim 1, wherein the transmitting the downlink control frame comprises:
    determining, by the base station, that the data frame to be transmitted from the base station to the UE uses a rank that is within a set of ranks and, based thereon,
    transmitting the downlink control frame.

5. The method of claim 1, wherein the transmitting the downlink control frame comprises:
    determining, by the base station for a set period of time, no data transmissions being scheduled prior to the transmission of the data frame and, based thereon,
    transmitting the downlink control frame.

6. The method of claim 1, wherein the transmitting the downlink control frame comprises:
    determining, by the base station, that a control frame transmission of the downlink control frame to the UE successfully triggers a transition of a receive RF chain of the UE to the ON state and, based thereon,
    transmitting the downlink control frame.

7. The method of claim 1, wherein the transmitting the downlink control frame comprises:

determining, by the base station, a request for a channel state information reference signal (CSI-RS) measurement and, based thereon,
transmitting the downlink control frame.

8. The method of claim 1, wherein the downlink control frame instructs the UE to transition a plurality of receive RF chains of the UE from the OFF state to the ON state.

9. The method of claim 1, wherein the capability message further indicates a second scheduling delay for transitioning a transmit RF chain of the UE from the OFF state to the ON state.

10. The method of claim 9, wherein the data frame is a first frame, and wherein the method further comprises:
transmitting, by the base station, a second downlink control frame indicating a second scheduled time for second transmission of a second data frame by the UE, a third time delay between the second scheduled time and a second reception time of the second downlink control frame being greater than or equal to the second scheduling delay.

11. The method of claim 10, further comprising:
receiving, by the base station from the UE, the second data frame in accordance with the second scheduled time.

12. The method of claim 1, wherein the scheduling delay corresponds to an activation of a scheduling time delay restriction, the activation corresponding to scheduling the scheduled time in accordance with a minimum time value.

13. The method of claim 12, wherein the minimum time value is pre-defined in a standard.

14. The method of claim 12, wherein the capability message comprises an activation bit indicating the activation or deactivation of the scheduling time delay restriction.

15. A method for wireless communication, the method comprising:
transmitting, by a user equipment (UE), a capability message to a base station, the capability message indicating a scheduling delay for the UE to receive a transmission from the base station;
receiving, by the UE, a downlink control frame from the base station, the downlink control frame indicating a scheduled time for reception of a data frame by the UE, wherein a time delay between the scheduled time and reception time of the downlink control frame is greater than or equal to the scheduling delay, and wherein the scheduling delay includes a second time delay for transitioning a receive radio frequency (RF) chain of the UE from an OFF state to an ON state; and
receiving, by the UE, the data frame over a physical downlink shared channel (PDSCH) from the base station in accordance with the scheduled time.

16. The method of claim 15, wherein the scheduling delay corresponds to a set of modulation and coding schemes (MCSs), and wherein a scheduled MCS of a corresponding frame transmission is within the set of MCSs.

17. The method of claim 15, wherein the scheduling delay corresponds to a set of ranks, and wherein a scheduled rank of a corresponding frame transmission is within the set of ranks.

18. The method of claim 15, wherein the downlink control frame instructs the UE to transition a plurality of receive RF chains of the UE from the OFF state to the ON state.

19. The method of claim 15, wherein the capability message further indicates a second scheduling delay for transitioning a transmit RF chain of the UE from the OFF state to the ON state.

20. The method of claim 19, wherein the data frame is a first frame, and wherein the method further comprises receiving, by the UE, a second downlink control frame indicating a second scheduled time for second transmission of a second data frame by the UE, a third time delay between the second scheduled time and a second reception time of the second downlink control frame being greater than or equal to the second scheduling delay.

21. The method of claim 20, further comprising:
transmitting, by the UE, the second data frame to the base station in accordance with the second scheduled time.

22. The method of claim 15, wherein the scheduling delay corresponds to an activation of a scheduling time delay restriction, the activation corresponding to scheduling the scheduled time in accordance with a minimum time value.

23. The method of claim 22, wherein the minimum time value is pre-defined in a standard.

24. The method of claim 22, wherein the capability message comprises an activation bit indicating the activation or deactivation of the scheduling time delay restriction.

* * * * *